United States Patent
Ten Haaft et al.

(10) Patent No.: US 12,214,818 B2
(45) Date of Patent: Feb. 4, 2025

(54) PUSHABLE AND RIDABLE INCLINABLE, MULTITRACK VEHICLE

(71) Applicants: Michael Ten Haaft, Deutchland (DE); Andreas Ten Haaft, Deutschland (DE)

(72) Inventors: Michael Ten Haaft, Deutchland (DE); Andreas Ten Haaft, Deutschland (DE)

( * ) Notice: Subject to any disclaimer, the term of this patent is extended or adjusted under 35 U.S.C. 154(b) by 1156 days.

(21) Appl. No.: 16/961,019

(22) PCT Filed: Dec. 21, 2018

(86) PCT No.: PCT/EP2018/086651
§ 371 (c)(1),
(2) Date: Oct. 2, 2020

(87) PCT Pub. No.: WO2019/137805
PCT Pub. Date: Jul. 18, 2019

(65) Prior Publication Data
US 2021/0009182 A1 Jan. 14, 2021

(30) Foreign Application Priority Data
Jan. 10, 2018 (DE) ...................... 10 2018 000 114.9

(51) Int. Cl.
*B62B 5/00* (2006.01)
*B62B 3/10* (2006.01)
(Continued)

(52) U.S. Cl.
CPC ............ *B62B 5/0043* (2013.01); *B62B 3/102* (2013.01); *B62B 5/085* (2013.01); *B62B 7/086* (2013.01);
(Continued)

(58) Field of Classification Search
CPC .... B62K 3/002; B62K 15/006; B62K 15/008; B62B 3/102; B62B 5/0043; B62B 7/086
See application file for complete search history.

(56) References Cited

U.S. PATENT DOCUMENTS 4,050,713 A * 9/1977 Williams ............... B62K 3/002
280/278
4,087,106 A * 5/1978 Winchell ............... B62B 13/12
280/14.28
(Continued)

FOREIGN PATENT DOCUMENTS

CN 101947990 A 1/2011
CN 203713946 U 7/2014
(Continued)

*Primary Examiner* — Jeffrey J Restifo
(74) *Attorney, Agent, or Firm* — Rabin & Berdo, P.C.

(57) ABSTRACT

Known vehicles, e.g. used for the sport of golf, which are configured combined for riding along and to be pushed with motorized support, exclusively comprise a steerable, rigid frame, causing the vehicle when positioned on the side of a slope to tilt parallel to the slope plane, consequently resulting in a disadvantageous, safety-relevant tilting moment. For improved driving safety, it should be possible to tilt the vehicle sideways. The vehicle according to the invention can be used in at least two operating modes. In the ride-along mode, at least a second and/or third vehicle component can be moved by the operator or an automatic, thus causing the vehicle to tilt sideways. This enables a carving effect and the tilt compensation as well as a straight-ahead drive at least in side slopes and inclines. In the push mode, the male/female user walks behind or beside the vehicle, and at least two vehicle components and/or parts thereof are located in a position, relative to each other, different as compared to the position in the ride-along mode. The versatile embodiment variations make it possible to use it as a golf vehicle, as well as a recreational-/, shopping-/, transport-/, industrial-/, construction site vehicle, and as a vehicle for the transport of senior and handicapped persons, for exploration and military purposes, for mowing, as an agricultural vehicle, as gardening appliance and as a child carrier.

27 Claims, 26 Drawing Sheets

Figure 1:
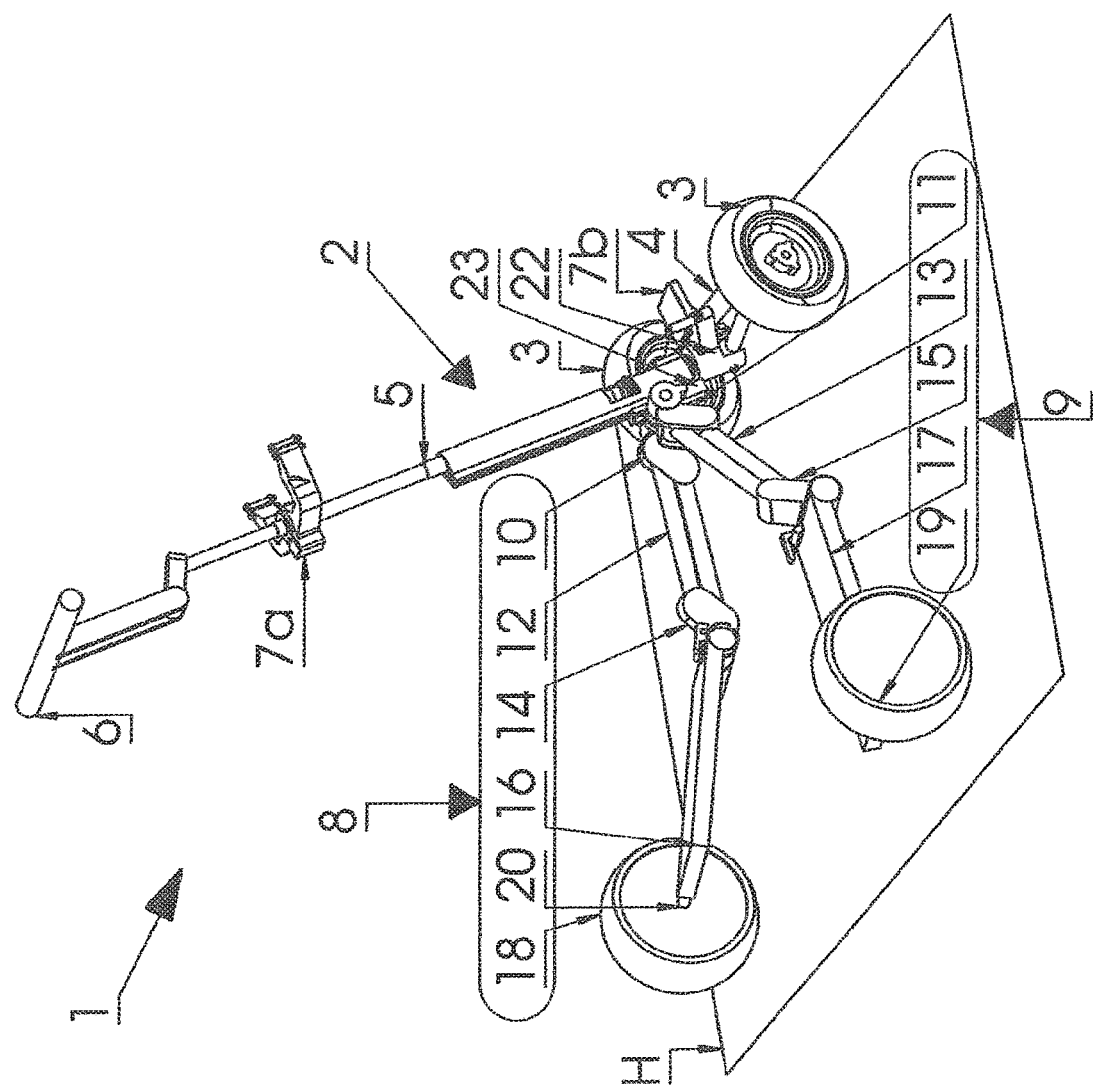

(51) Int. Cl.
  *B62B 5/08* (2006.01)
  *B62B 7/08* (2006.01)
(52) U.S. Cl.
  CPC ..... *B62B 2202/404* (2013.01); *B62B 2202/42* (2013.01)

(56) References Cited

U.S. PATENT DOCUMENTS

| | | | | |
|---|---|---|---|---|
| 4,088,338 A * | 5/1978 | Winchell | ........... | B62K 3/002 280/220 |
| 4,165,093 A * | 8/1979 | Biskup | ........... | B62K 9/02 280/220 |
| 4,540,192 A * | 9/1985 | Shelton | ........... | B62K 3/002 280/282 |
| 5,375,673 A * | 12/1994 | McCall | ........... | B62B 3/12 180/19.1 |
| 6,220,612 B1 * | 4/2001 | Beleski, Jr. | ........... | B62K 15/006 280/87.041 |
| 6,279,930 B1 * | 8/2001 | Chang | ........... | B62K 3/002 280/87.043 |
| 6,467,781 B2 * | 10/2002 | Feng | ........... | B62K 3/002 280/87.041 |
| 6,478,104 B1 * | 11/2002 | Kemper | ........... | B62D 51/001 180/211 |
| D495,758 S * | 9/2004 | Chuang | ........... | D21/423 |
| 6,851,694 B2 * | 2/2005 | Feng | ........... | B62K 3/002 280/220 |
| 6,880,840 B2 * | 4/2005 | Chuang | ........... | B62K 3/002 280/87.041 |
| 6,908,090 B2 * | 6/2005 | Chuang | ........... | B62K 21/00 280/87.041 |
| 6,908,091 B2 * | 6/2005 | Chuang | ........... | B62K 3/002 280/87.041 |
| 7,438,297 B2 * | 10/2008 | Fernandez | ........... | B62K 13/00 280/220 |
| 7,591,337 B2 * | 9/2009 | Suhre | ........... | B60G 3/20 280/5.509 |
| 7,803,090 B2 * | 9/2010 | Kraus | ........... | B62K 3/002 280/224 |
| 8,028,777 B2 * | 10/2011 | Kakinuma | ........... | A63C 17/08 180/218 |
| 8,328,209 B2 * | 12/2012 | Tsai | ........... | B62K 15/008 280/87.043 |
| 8,505,945 B2 * | 8/2013 | Chen | ........... | B62K 3/002 280/47.11 |
| 8,696,000 B1 * | 4/2014 | Chen | ........... | B62K 3/002 280/87.041 |
| 8,985,602 B2 * | 3/2015 | Chan | ........... | B62K 21/005 280/87.041 |
| 9,079,598 B1 * | 7/2015 | Oreyang | ........... | B62B 3/022 |
| 9,302,728 B1 | 4/2016 | Yang | | |
| 9,555,822 B2 * | 1/2017 | Rauch | ........... | A63B 55/61 |
| 9,610,998 B1 * | 4/2017 | LaBonty | ........... | B62K 5/05 |
| 9,643,679 B2 * | 5/2017 | Desberg | ........... | B62K 5/06 |
| 9,873,475 B2 * | 1/2018 | Baron | ........... | B62K 3/002 |
| 10,016,666 B2 * | 7/2018 | Reimers | ........... | B62B 5/0053 |
| 10,322,767 B2 * | 6/2019 | Dragomir | ........... | B62M 3/08 |
| 10,343,740 B2 * | 7/2019 | Kama | ........... | B62K 15/006 |
| 10,351,202 B2 * | 7/2019 | Kama | ........... | B62K 5/06 |
| 10,450,027 B2 * | 10/2019 | Kistemaker | ........... | B62J 43/16 |
| 10,450,028 B2 * | 10/2019 | Kama | ........... | B62K 11/14 |
| 10,457,342 B2 * | 10/2019 | Kama | ........... | B62K 5/027 |
| 10,640,166 B2 * | 5/2020 | Kama | ........... | B62K 3/002 |
| 10,654,362 B2 * | 5/2020 | Kama | ........... | B62K 5/06 |
| 10,717,491 B1 * | 7/2020 | Neville | ........... | B62K 15/008 |
| 10,822,046 B2 * | 11/2020 | Huang | ........... | B62K 15/006 |
| 10,926,826 B2 * | 2/2021 | Jiang | ........... | B62K 5/10 |
| 11,383,786 B2 * | 7/2022 | Desberg | ........... | B62K 5/10 |
| 11,420,703 B2 * | 8/2022 | Virag | ........... | B62K 3/002 |
| 11,724,175 B2 * | 8/2023 | McGowan | ........... | B62M 1/20 280/87.041 |
| 2004/0262871 A1 * | 12/2004 | Schreuder | ........... | B60P 3/007 280/87.1 |
| 2006/0054370 A1 * | 3/2006 | Sugioka | ........... | B62D 61/065 180/211 |
| 2011/0298193 A1 * | 12/2011 | Fan | ........... | B62K 3/002 280/221 |
| 2012/0068433 A1 * | 3/2012 | Eliasson | ........... | B62K 15/00 280/639 |
| 2016/0272264 A1 * | 9/2016 | Mogensen | ........... | B62K 5/10 |
| 2017/0029060 A1 * | 2/2017 | Kim | ........... | B62K 5/06 |
| 2021/0009182 A1 * | 1/2021 | Ten Haaft | ........... | B62K 15/008 |
| 2022/0048587 A1 * | 2/2022 | Zhang | ........... | B62K 15/008 |
| 2022/0204113 A1 * | 6/2022 | Wang | ........... | B62K 5/10 |
| 2022/0306233 A1 * | 9/2022 | Chee | ........... | B62K 21/06 |
| 2023/0348010 A1 * | 11/2023 | Klier | ........... | B62K 3/002 |
| 2024/0051590 A1 * | 2/2024 | Zhang | ........... | B62B 5/0053 |

FOREIGN PATENT DOCUMENTS

| | | |
|---|---|---|
| CN | 106428344 A | 2/2017 |
| EP | 1917174 B1 | 9/2012 |
| EP | 3246235 B1 | 3/2020 |
| GB | 2542258 A | 3/2017 |
| JP | 2004106781 A | 4/2004 |
| WO | 2002036419 A1 | 5/2002 |
| WO | 2005025972 A1 | 3/2005 |
| WO | 2012069656 A1 | 5/2012 |
| WO | 2016187834 A1 | 12/2016 |
| WO | 2017164928 A1 | 9/2017 |

* cited by examiner

PUSHABLE AND RIDABLE INCLINABLE, MULTITRACK VEHICLE

The invention relates to a vehicle for riding along and pushing which can additionally transport items.

The vehicle can be used, for example, as a golf vehicle for transporting a golf bag with golf clubs, but additionally also as recreational vehicle, and/or shopping vehicle, and/or transport vehicle, and/or vehicle used in industry and/or on construction sites, and/or as vehicle transporting seniors and/or handicapped persons, and/or as children's carriage, and/or as exploration vehicle, and/or as gardening tool/mowing vehicle, and/or as agricultural vehicle, and/or as military vehicle.

The idea for a vehicle as described in the claims was originally conceived on a golf course.

On the golf course, there is a demand for a vehicle which can motor driven be utilized flexibly.

Golf players have always had the desire to transport their golf equipment in the most comfortable manner possible across the golf course and with the lowest possible effort. It is a proven fact that motorized transportation means improve the game result over an approximately 10 km distance on an average golf course. The extravagantly designed golf courses with hill and valley architecture, the increasing age of the golf players with increasing health restrictions, as well as the lack of time for players still working, furthermore increase the desire to have their own vehicle, which can be used flexibly, as needed, by pushing respectively by steering while walking behind or beside it and to ride along.

Commercial golf clubs have an interest in allowing the highest possible number of paying customers to play each day, meaning to play an 18-hole golf round in the shortest possible time.

The use of a cart rented from the golf club—a four-wheel vehicle for transporting up to two persons and their golf bags—is disadvantageous because the inherent weight of approximately 400 kg leads to increased stress for the lawn on the fairways. When used by two persons, the cart is furthermore usually moved to the ball position of each player. If the respective ball positions are at a greater lateral distance relative to each other, this also results in an additional expenditure of time in addition to the stress on the lawn.

At a distance of approximately 20-50 meters around the so-called "green," where the player must hole in his ball, meaning the final playing area of each fairway, the grass is mowed shorter and thus more sensitive to higher stress. Vehicles are therefore prohibited from driving in this area and golf vehicles are only allowed to be pushed. The male/female player(s) must then drive the cart on the side path and walk back from there with another expenditure of time to their ball in the direction of the "green."

On some golf courses the driving of carts on the fairways is prohibited totally, so that a cart must generally be driven on the side driveway during the complete golf round. For this, for most shots the male/female player must walk from the side driveway to the ball position and back to the cart, then drive to the next ball position etc. It also happens that the player did not take the correct club from the bag because the player did not recognize the correct ball position and must then walk back again to the cart. The additional time expenditure as compared to a player who primarily stays on the fairways is enormous with those types of golf courses.

If a player group, consisting of up to four persons, is particularly slow, this time delay which affects the following player groups, can lead on high use days to starting time delays for many players and waiting times at the fairways lasting until the evening.

Bad weather can also contribute to the fact that the fairways of golf courses are not allowed to be driven on. In particular following very strong rain or rain lasting for days, the driving on fairways with vehicles is often prohibited to protect the lawn. In that case, even owners of golf vehicles which only permit the driving along are restricted. These owners consequently must have a second golf vehicle for pushing, or rent it for a fee.

The vehicle according to the invention can be pushed respectively steered by a male/female user walking behind or beside it and it can be driven individually and in a time saving manner directly to the player's ball position while standing or sitting thereon. In the process, the vehicle can be tilted to the side, whereby making possible a sporty driving on the fairways with so-called carving and a tilt compensation of ascent and descent, on at least side slopes as well as inclined positions, e.g. at offset planes. Shortly before reaching the green, one changes from the driving operation to the pushing operation, so that the vehicle can continue to be used like a pushing trolley until the end of the fairway.

To arrive as fast as possible at the next so-called tee, the start of each fairway, one changes again to the driving operation.

It is not rare to have a distance of several hundred meters between a green and the tee for the next fairway. The driving operation is a considerable time advantage for the course of the game, the time expenditure of the golf player, and thus also for the golf club.

After the end of the game, the vehicle is stored compact in the pack mode inside a locker of the golf club or is loaded into a car. Advantageously, the weight to be lifted can be reduced considerably by disassembly of vehicle elements such as the drive wheel, the accumulator and the like.

The aforementioned flexible characteristics combined in a single vehicle are also of particular interest for other areas of use, respectively purposes.

As a recreational vehicle, it is a lot of fun to drive. It can also be used for sporty driving and, in case of local restrictions, can easily be pushed respectively steered while walking behind or alongside.

For shopping, the vehicle can be pushed respectively steered between supermarket shelves while walking behind or beside it, and can subsequently be driven home.

As a transport-/industry- and construction site vehicle, it serves with potential additional equipment for the transport of persons and material, for example it is driven over longer distances and is pushed respectively steered while walking behind or alongside in restricted areas.

For exploration and in the terrain, it can be used with the corresponding equipment as exploration vehicle, military vehicle as well as agricultural vehicle.

With additional appliances, e.g. a mowing motor, it can also be used along sloped areas/inclines as gardening equipment and mowing vehicle.

It can be used to transport people as a vehicle for transporting senior and handicapped persons, and as a child carrier to accommodate child seats with ride-along features, wherein the vehicle can also transport two or more persons either standing and/or sitting, e.g. in that two or more persons respectively stand and/or sit on at least one footboard/seat, or also one person sits while the second person steers the vehicle while standing thereon, or as needed, the vehicle with one person sitting thereon is pushed respectively steered from another person while walking behind or beside it. Following its use, the vehicle can then be stored space-saving in the pack mode, e.g. in the hallway of an apartment, or transported with reduced packing dimension, e.g. in the trunk of an automobile.

PRIOR ART

In addition to the traditional manual golf trolleys, such as the two-wheeled pull-along trolleys and the three-wheelers as well as four-wheeled push trolleys, numerous electrically driven golf trolleys are known for many years from the prior art.

Until now, these were exclusively provided with a driven push mode and make it easier for the golf player to manually push the golf equipment with for the most part electrical drives.

For some years now, special forms of golf vehicles are known which have been designed exclusively for standing on/riding along.

The EP 1 917 174 B1 describes a battery-operated golf vehicle which combines both operational modes, meaning the pushing as well as standing thereon/riding along. It shows a golf vehicle where a footboard is used for standing/riding along which forms a single unit with the aid of a rigid connection between the left and the right wheel arm.

This golf vehicle has a standing surface which tilts together with the complete vehicle parallel to the slope plane during a drive on a side slope, thus generating a tilting moment. During a curve drive, the vehicle with its standing surface remains rigidly in its position parallel to the ground surface, whereby causing at least an unpleasant feeling for the user because of the centrifugal forces effective during the curve drive. Additionally, the risk exists that the vehicle can flip over during a fast drive around tight curves.

It is the object of the present invention to provide a vehicle which permits the use on the golf course more flexibly and adapted to the respective situation and causes an improved driving experience.

This object is solved with a vehicle having the features according to claim 1.

Short Description

The vehicle according to the invention is embodied such that it can be operated in at least two pre-selectable operating modes, namely a first operating mode for riding along where at least one male/female user can stand and/or sit on at least one surface and which henceforth is also called ride-along mode, as well as a second operating mode for pushing where at least one male/female user walks behind or beside the vehicle and either steers it while it moves automatically driven, or pushes it while it is in neutral gear, henceforth also called a push mode.

Caused by the type of suspension of the individual vehicle components, the vehicle in the ride-along mode can be tilted to the side by the at least one male/female user or an automatic. As a result, at least along side slopes and inclined positions, e.g. at offset planes, a tilt compensation of the slanted position, the driving with so-called carving, as well as an advantageous standing and/or sitting position with preferred body posture for the at least one male/female user is made possible and, in the pushing mode, at least two vehicle components and/or respective parts/sub components thereof are located in a preset position, relative to each other, different as compared to the position in the ride-along mode.

Wherein based on the design, it can be possible that this type of suspension of the vehicle components can also be used in the push mode, so that at least one male/female user or an automatic can compensate the inclination, at least on side slopes as well as in inclined positions, e.g. at offset planes, while walking behind or alongside the vehicle and either steering it while it drives automatically or pushing it while it is in the neutral gear.

The preferred body posture of the at least one male/female user can differ considerably, depending on the road surface or terrain respectively, as well as the tilt on side slopes or in inclined positions, e.g. at offset planes, and in curve positions. While humans predominantly strive for a balanced body posture where equilibrium exists via their equilibrium organs, when driving through curves and depending on the speed, a totally different body posture may be considerably more comfortable and thus preferred for the at least one male/female user. The flexible adaptation options of the vehicle in each case favor the taking of a preferred body posture for the at least one male/female user and are conducive to an improved driving feeling and advantageous standing and/or sitting position.

This flexible adaptation is made possible in that the vehicle has at least one second and one third vehicle component, which are respectively located on the left and right side of the vehicle longitudinal axle, respectively provided with at least one wheel, and rotatably and/or pivotably mounted at at least one first vehicle component dependent and/or independent of each other. When driving, a carving is thus also possible, which provides the so-called carving effect.

When driving through a curve with a vehicle, a force (centrifugal force) is exerted onto the vehicle and the male/female driver, which must be compensated through tilting toward the curve inside, so that one is not carried to the outside and tips over. Vehicles known so far, designed for riding along as well as for pushing, do not have means permitting the tilting toward the inside by changing the position of the axes. With the vehicle according to the invention, the at least one male/female user or an automatic can move the center of gravity closer to the center of the curve movement through a tilting of the vehicle toward the inside, and the centrifugal force can thus be reduced based on the formula:

$$m \cdot r \cdot w^2$$

m=weight of the body subjected to the centrifugal force
r=distance of the body to the center point of the circular movement
$w^2$=square of angular speed The carving effect allows faster travel through curves and permits the at least one male/female user an advantageous standing and/or sitting position when traveling on the side of a slope as well as in inclined positions, e.g. with offset planes, and provides a higher tilting safety, than vehicles according to the prior art.

When driving along the side of a slope or at offset planes, the relative position of the lateral at least second and/or third vehicle components relative to each other can be changed by the at least one male/female user or an automatic in a way that parts/sub-components of the vehicle are rotated around the longitudinal vehicle axis and by taking this roll angle, the tilt of the slope respectively incline, e.g. at offset planes, can be compensated. As a result, at least the vehicle position, or the vehicle length, or the vehicle width, or the vehicle height, or the seat height changes.

The vehicle can also have additional vehicle components with or without wheels.

The vehicle can be used, for example, as golf vehicle for transporting a golf bag with golf clubs, and/or as recreational vehicle, and/or as shopping vehicle, and/or as transport vehicle, and/or as industrial vehicle, and/or as vehicle for construction sites, and/or as transport vehicle for seniors and/or handicapped persons, and/or as child carrier, and/or as exploration vehicle, and/or as gardening tool/mowing vehicle, and/or as agricultural vehicle, and/or as military vehicle.

The vehicle comprises a first, pre-selectable operating mode in which at least one male/female user can stand and/or sit on at least one surface and in which at least one wheel on the vehicle is driven at least temporary, wherein it may also be possible to switch temporary to neutral gear respectively, of course, the wheel is not driven during the braking operation. In the at least first operating mode, at least the second and/or the third vehicle component and/or parts/sub-components thereof can be moved directly or indirectly, at least partially vertically around at least one rotational axis at the first vehicle component by the at least one male/female user or an automatic. The driving with the above-described carving effect is thus made possible and the tilt can be compensated, at least on side slopes and inclined positions, e.g. at offset planes.

The vehicle furthermore has a second pre-selectable operating mode in which at least one male/female user walks behind or beside the vehicle and either steers it while it moves automatically driven, or pushes it while it is in neutral gear, and in which at least two vehicle components and/or parts/sub-components thereof are located in a preset position, relative to each other, different as compared to the position in the first operating mode. As a result, the vehicle can be used or taken along, for example, around the green of a golf course where no large vehicles such as carts are allowed, respectively where the driving of vehicles is not permitted, or as a shopping cart in a supermarket, or as a vehicle for locally restricted driving.

According to the invention, the embodiments of the second pre-selectable operating mode are manifold and depend individually on the vehicle type and use of the vehicle.

According to a simple embodiment, for example, a steering rod whose length and/or position can be changed pre-selectably be put into a position suitable and intended for pushing the vehicle. However, more practical are embodiments, in which in the push mode the length, and/or the width, and/or the height of the vehicle, and/or the seat height changes pre-selectably. With respect to design, vehicle dimensions can thus be realized, for example, which permit unrestricted walking of the male/female user behind or beside the vehicle, as well as to take into account conditions or needs typical for other uses.

The vehicle has at least two operating modes in which the vehicle can be moved on at least three wheels respectively, wherein in each of the at least two operating modes, at least one person and/or material can be transported and/or devices/machines can be utilized as additional equipment which can remain with the vehicle also during a change in the operating mode.

Advantageously, in at least the first operation mode, the movement(s), of at least the second and/or third vehicle component, and/or the respective parts/sub-components thereof generated by at least one male/female user and/or an automatic, can occur individually or in the stroke one-sided or both-sided, evenly or unevenly, at least partially vertically either directly or indirectly around at least one rotational axis of the first vehicle component in one direction or different directions.

Conceivable is an even or uneven movement of at least two vehicle components or respective parts/sub-components thereof in one direction, e.g. for an exploration vehicle, which also operates autonomously or via remote control, which is provided with a fourth and fifth vehicle component each being side-mounted, and which is located in a tunnel with height restrictions. Wherein at least in the first operating mode, the four lateral vehicle components can be moved evenly or unevenly at least partially vertically upward in the stroke and the first vehicle component can be lowered. Additional equipment with corresponding mechanical as well as electronic devices and various sensors can support such an embodiment.

A further embodiment represents a senior or handicapped person vehicle, provided with a second to fifth vehicle component each having respectively at least one wheel, and a sixth vehicle component with at least one seat. For this, the lateral second to fifth vehicle component, for example, can realize at least in the first operating mode respectively an even or uneven vertical stroke movement in the same direction, causing the sixth vehicle component with a seated person to raise or lower, wherein this type of suspension can also be advantageous in the second operating mode in that the seating height and the grip height for pushing the vehicle can be adapted individually to the requirements.

According to one advantageous embodiment, the suspension of at least the second and third vehicle component and/or respective parts/sub-components thereof takes place at at least one rotational axle of the first vehicle component, dependent and/or independent of each other.

The vehicle advantageously also has a third pre-selectable and adjustable operating mode in which at least one male/female user can stand and/or sit on at least one surface, wherein at least one wheel at the vehicle is driven at least some of the time and in which at least the second and third vehicle component and/or parts/sub-components thereof are locked to the first vehicle component. By means of the locking, a movement of the at least second and third vehicle components, at least relative to the first vehicle component is prevented in the joints.

The third operating mode can be selected by the at least one male/female user, for example if the vehicle moves exclusively on a level surface. The vehicle thus becomes inherently stiffer and allows the use in the traditional driving manner, if desired by the at least one male/female user.

According to a further preferred embodiment, at least in the second operating mode for pushing the vehicle length, and/or width, and/or height, and/or seat height changes preset, as compared at least to the first and/or third operating mode for riding along.

Further advantageously, several steerable wheels can be arranged on the first vehicle component on one or several mountings, which are positioned pivoting and/or rotating in at least one receptacle. For example, this can be two wheels on a front axle which are arranged via a pivot joint on the first vehicle component. However, different arrangements and additional wheels are also conceivable.

According to one advantageous embodiment, the vehicle is steered through rotating and/or pivoting at least one steering column or steering rod, either directly or indirectly. In case of indirect steering, the steering movement would be transmitted via one/several mechanical system(s), and/or gear(s), and/or chain(s), and/or cable(s) and the like.

The vehicle can advantageously be provided with a steering column that is mounted rigid, and/or rotating, and/or pivoting, wherein at least one wheel on the vehicle is provided with at least one motor, which can steer the vehicle electrically controlled by at least one user or an automatic. When equipped with a rigid steering column, for example, two driven wheels with different rotational speed can thus carry out the steering movement. Other embodiments are also possible, e.g. with one driven wheel or additional driven wheels.

The steering can also be realized advantageously via one/several mechanical system(s) and/or via one or several drive(s), indirectly with the aid of electronic control, wherein by rotating and/or pivoting the steering column, and/or at least one axle, and/or at least one wheel, which can also comprise at least one motor, the steering movement is realized electrically controlled. Also conceivable is a variant with rigid steering column and provided with a so-called joystick where, for example, two wheels on a pivoting front axle, or also a single wheel, permit an electrically controlled steering of the vehicle, at least through turning of the wheel respectively wheels, wherein the electrically-controlled pivoting movement is also possible at the two-wheel front axle, e.g. for inclined positions. On the basis of this equipment, numerous additional interesting variants are possible.

When using an electric motor, this motor can also function as generator to charge accumulators during the braking operation.

It is advantageous if at least in the first operating mode a straight-ahead driving is possible at least lateral on a slope as well as in inclined positions, e.g. at offset planes, even when the vehicle position changes and an at least partial vertical movement of at least the second and/or third vehicle component and/or respectively parts/sub-components thereof.

It is further advantageous if at least in the first operating mode, at least one male/female user or an automatic can move respectively individually and/or on one side the at least second or third vehicle component(s) and/or standing surface(s), located upslope or on the curve inside, around at least one rotational axis on the first vehicle component, at least in curve positions and/or side slope positions as well as inclines, e.g. at offset planes, whereas individually and/or on one side the at least second or third vehicle component(s) and/or standing surface(s), positioned downslope or on the curve outside, remains (remain) nearly or completely unchanged in the position as for a level surface during a straight-ahead drive. The carving effect is thus generated which makes possible a tilt compensation, at least in side slope positions as well as in inclines, e.g. at offset planes.

It is also advantageous if at least during the first operating mode at least one male/female user or an automatic can move at least in curves and side slope positions as well as in inclined positions, e.g. at offset planes, the at least second and third vehicle component(s) and/or standing surface(s), which are positioned upslope or on the curve inside and downslope or on the curve outside, respectively at least individually and/or per side, at least in part vertically around at least one rotation axis on the first vehicle component, because this also makes a carving possible and allows for compensating the tilt of the inclination, at least on side slopes and inclined positions, e.g. at offset planes.

Further advantageously, the vehicle can be embodied such that the standing or footboard surface(s) is (are) attached movable to at least one vehicle component, so that at least in the first operating mode, at least one male/female user or an automatic can realize a tilt compensation at least on side slopes as well as in inclined positions, e.g. at offset planes, independent of a movement of the corresponding vehicle component. This means that in this embodiment, the carving effect would be achieved through moving the standing or footboard surface(s), relative to the corresponding vehicle component(s).

It is advantageous that in the second operating mode for pushing, the first vehicle component and/or parts/sub-components thereof are in a preset position relative to at least one other vehicle component and/or parts/sub-components thereof, different as compared to the position in at least the first operating mode.

The vehicle advantageously comprises an additional mode, henceforth called pack mode, which allows putting the vehicle into a more compact form for its transport in a different vehicle, e.g. the trunk of an automobile, or for storing it in a closet.

That can be achieved in that the second and third vehicle components, and/or also further vehicle components such as a fourth vehicle component etc., are respectively composed of at least two parts that are connected by at least one joint, wherein for the pack mode the at least two parts are respectively pivoted and/or rotated around the corresponding joint(s). As a result, the vehicle can be folded up to a more favorable packing dimension.

With a furthermore advantageous embodiment, the vehicle has at least one holder or holding option for attaching additionally one or several seating surface(s), and/or golf bag(s), and/or transport container(s), and/or tool(s), and/or ladder(s), and/or device(s), and/or construction equipment, and/or mowing appliance(s), and/or other device(s), and/or weapon(s) and the like.

Depending on the design, the vehicle can also be used as mowing vehicle by attaching/fastening mowing equipment, or can be provided with a ladder for use in the construction/industrial area, which is also an advantage for side-slope positions as well as inclined positions, e.g. at offset planes, in various operating modes.

In an embodiment to transport seniors and handicapped persons, provided with one/several seating surface(s) and/or standing or footboard surface(s), or with accommodion for child carriers as child carriage with ride-along features, it can also transport several people in various ways. The vehicle can thus transport in the ride-along mode two or more persons for example, standing and/or sitting, in that for example two persons respectively stand on and/or sit on a footboard/seat, or one person is sitting while the second person steers the vehicle while standing on it or, as required, in the push mode with one person sitting thereon and being steered while it moves automatically driven, or being pushed along while in neutral gear by another person walking behind or on the side.

In a further advantageous manner, at least some of the wheels and/or other structural components are arranged such that they can be removed and/or pivoted for the transport or storage, e.g. in a closet. By removing components such as wheels and/or accumulators, and/or motors and the like, the weight can be reduced considerably, which is useful for lifting the vehicle, e.g. for loading it into the trunk of an automobile or for transporting the vehicle to a basement.

In an additionally advantageous embodiment the vehicle is provided with one or several motors that drive it. These can be one or several electric motors or combustion engines. The vehicle can furthermore be provided with one or several accumulators for supplying power, or a tank for fuel, or with fuel cells. A hybrid drive consisting of electric motor(s) and combustion engine(s) would also be possible. The vehicle can furthermore have one or several control systems for controlling the motor(s).

The motor(s) can also be used for recuperation and, in the process, can be utilized for braking purposes and/or for charging one or more accumulators.

Installing solar cells on the vehicle for charging the accumulator(s) is also conceivable.

One advantageous option consists in equipping the vehicle with pedals to allow the male/female user to drive the vehicle with muscle power, in a bicycle similar locomotion. This can also be possible in combination with one or several motors.

A further advantageous embodiment allows using the vehicle in neutral gear, without switching on the drive. This can be advantageous, for example if in a configuration with at least one electric motor the accumulators(s) have no power anymore, and the male/female user must push the vehicle manually without motorized support.

In addition, the vehicle could also be controlled with a remote control, which allows a control without body contact and/or contact control and/or manual steering.

Also possible would be providing the vehicle with at least one steering mechanism, which makes possible an autonomous driving without intervention by the male/female user. The combination with electronic driving assistants, parking aids, and the like would be possible. This would make the vehicle more secure and allow the male/female user to utilize the driving time for other activities.

According to one advantageous embodiment, the vehicle could be provided with an automatic allowing automatically and/or via remote control a transition from the pack mode to an operating mode, and/or vice versa, and/or from an operating mode to a different operating mode. This could be realized, for example, with one or several mechanical device(s) and/or drive(s) with the aid of an electronic control, thereby making it possible for a somewhat weaker male or female senior user to bring the vehicle into a different mode without relevant force expenditure.

It may also make sense to use this/these mechanical system(s) and drive(s), with support from control electronics and additional tilt sensors, either automatically and/or with remote control for the tilt compensation of vehicle components and/or parts/sub-components thereof to the ascent respectively the descent at least during uphill/downhill drives and/or on side slopes as well as in inclines, e.g. at offset planes, and/or in curves, for example to automatically adapt an upright vehicle position. Also the change in the seat height, vehicle height, vehicle length and vehicle width would be possible to be controlled automatically and/or with remote control.

For another advantageous embodiment, the vehicle could be provided with one or several devices for attaching trailers and could be used as towing vehicle.

The vehicle can also be equipped advantageously with at least one support wheel to prevent the vehicle from tipping over in at least the first operating mode, and/or with at least one stand for a secure standing of the vehicle during the transport while components such as wheels and the like are disassembled and/or the vehicle is folded up in the pack mode.

It is further useful to have at least one holder or holding option for attaching and transporting the vehicle at the trailer hitch of an automobile.

Of particular advantage are the vehicle dimensions, so that at least one vehicle axle and/or at least two wheels positioned laterally opposite each other, have a maximum outside dimension, measured in the width transverse to the vehicle longitudinal axis on the respective outside edge of the wheel, which is smaller than a dimension resulting from the diameter of the largest wheel on the same axle, multiplied by a factor of 5.

As a result, an especially small packing size can be realized in the pack mode once parts of the vehicle, such as wheels and/or accumulators, have been removed.

The vehicle according to the invention can be used not only for the golf sport, but additionally also as recreational vehicle, and/or shopping vehicle, and/or transport vehicle, and/or industrial vehicle, and/or construction site vehicle, and/or vehicle for transporting seniors and/or handicapped persons, and/or as child carriage, and/or as exploration vehicle, and/or as garden tool/mowing vehicle, and/or agricultural vehicle, and/or military vehicle.

The use as an exploration vehicle is for example possible, in which for example the vehicle is transported in the pack mode inside a space vehicle to a celestial body and automatically unfolds there into the first operating mode and moves along autonomously. For the movement in the terrain where conditions cannot be anticipated, the described carving effect would be a considerable advantage as compared to the vehicles known from prior art. In the second operating mode, the vehicle would change its dimensions, e.g. the width or height in the case of corresponding spatial restrictions. In place of a male/female human user, for example, a computer, robot or similar device would steer, respectively control the vehicle, or the vehicle would be remote-controlled.

DETAILS OF THE INVENTION

According to the invention, the vehicle can be constructed in numerous embodiments as well as designed with numerous configuration features on the basis of the relevant basic characteristics of at least two pre-selectable operating modes for riding along and pushing, combined with a direct or indirect, at least partially vertical movement of at least the second and/or third vehicle component and/or parts/sub-components thereof, around at least one rotational axis at the first vehicle component by the at least one male/female user or an automatic, wherein at least the vehicle position, or vehicle length, or vehicle width, or vehicle height, or the seat height changes, at least in the first operating mode, wherein in the second pre-selectable operating mode for pushing, at least two vehicle components and/or parts/sub-components thereof are located in a preset position, relative to each other, different as compared to the position in at least the first operating mode.

According to a first embodiment, it is a multi-track vehicle with a first vehicle component, at least one steerable wheel and at least a second and a third vehicle component, positioned on the left and right of the vehicle longitudinal axis, wherein at least the second and third vehicle component comprise respectively at least one wheel, meaning it has a flexible basic frame.

There are at least two operating modes, a first operating mode where at least one male/female user can stand and/or sit on at least one surface, wherein at least one wheel on the vehicle is driven at least temporarily and where at least one male/female user or an automatic can move at least the second and/or third vehicle component and/or parts/sub-components thereof either directly or indirectly, at least in part vertically, around at least one rotational axis at the first vehicle component, whereby at least the vehicle position, or the vehicle length, or the vehicle width, or the vehicle height, or the seat height changes, as well as a second, pre-selectable operating mode in which at least one male/female user walks behind or beside the vehicle and in which at least two vehicle components and/or parts/sub-components thereof are preset positioned at a position, relative to each other, different as compared to the position in at least the first operating mode.

Figure 2:
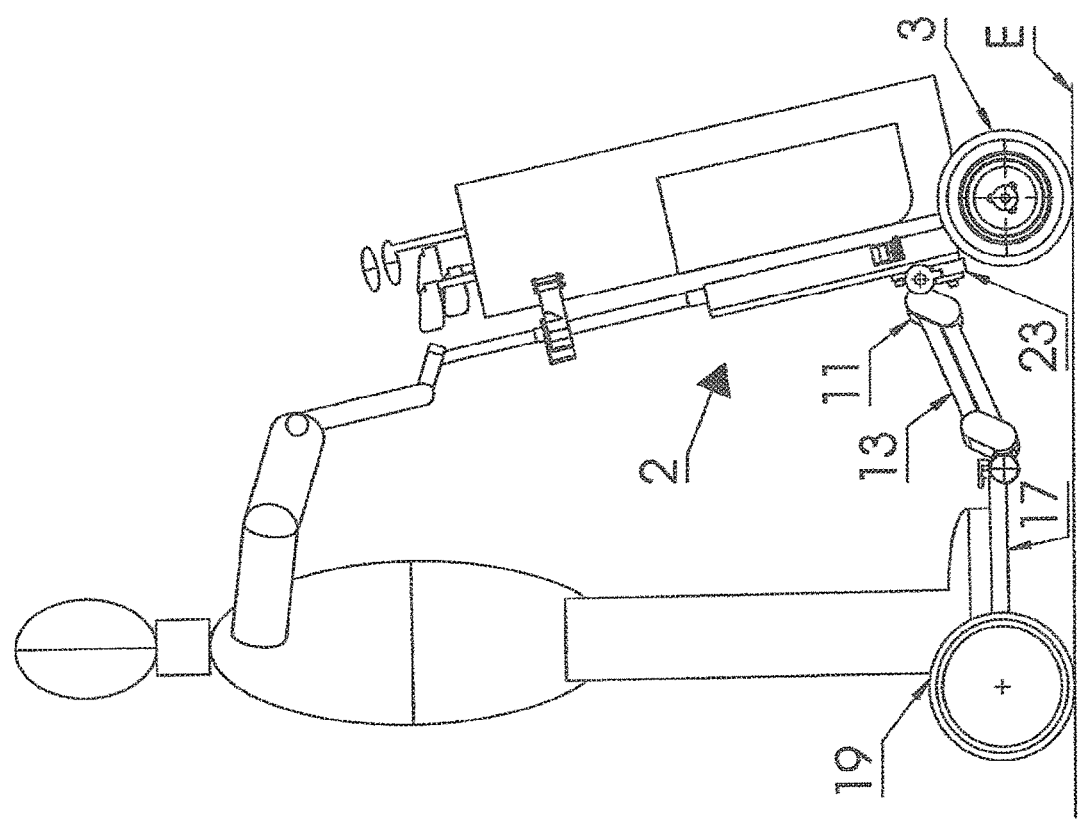
Figure 3:
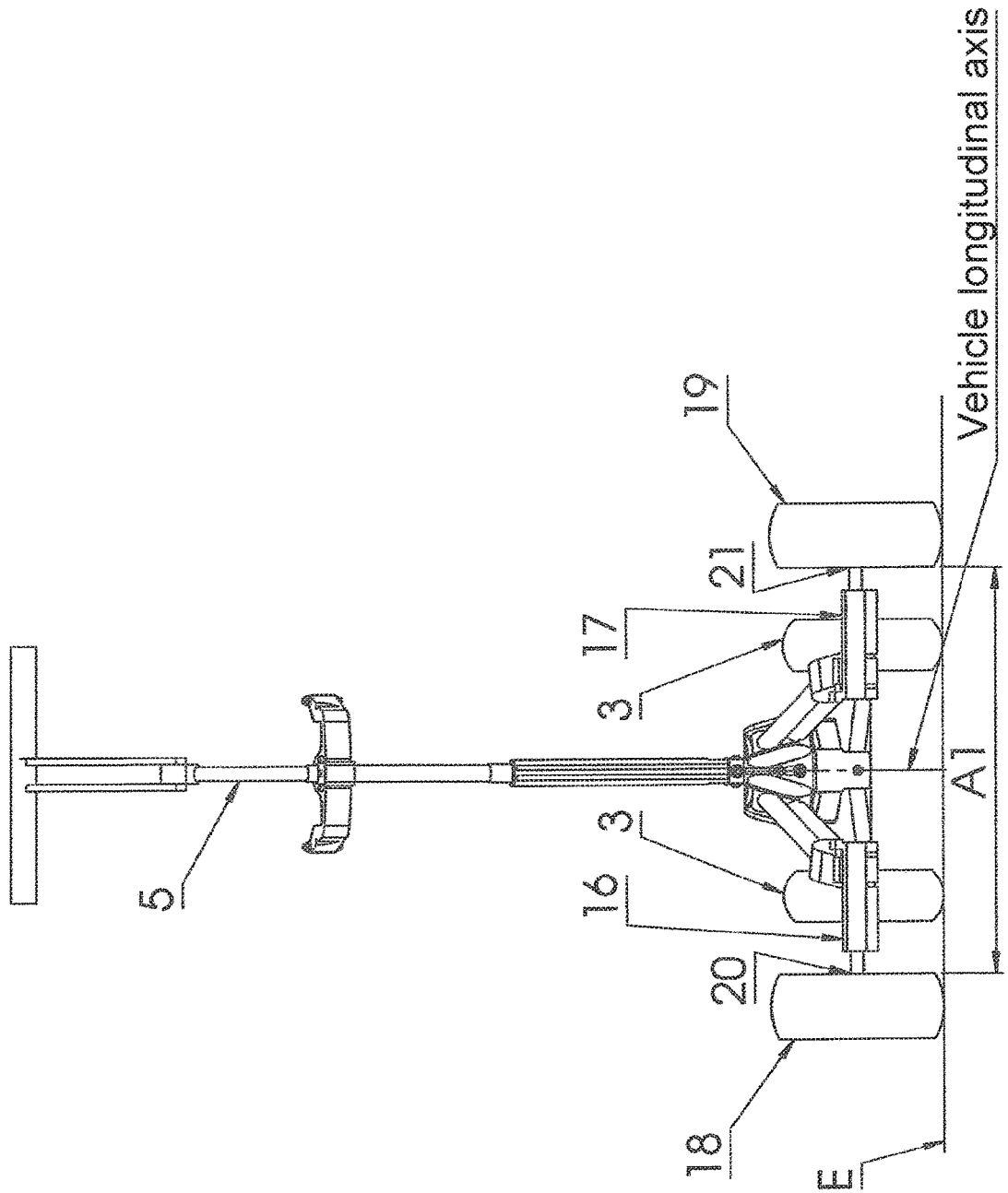
Figure 4:
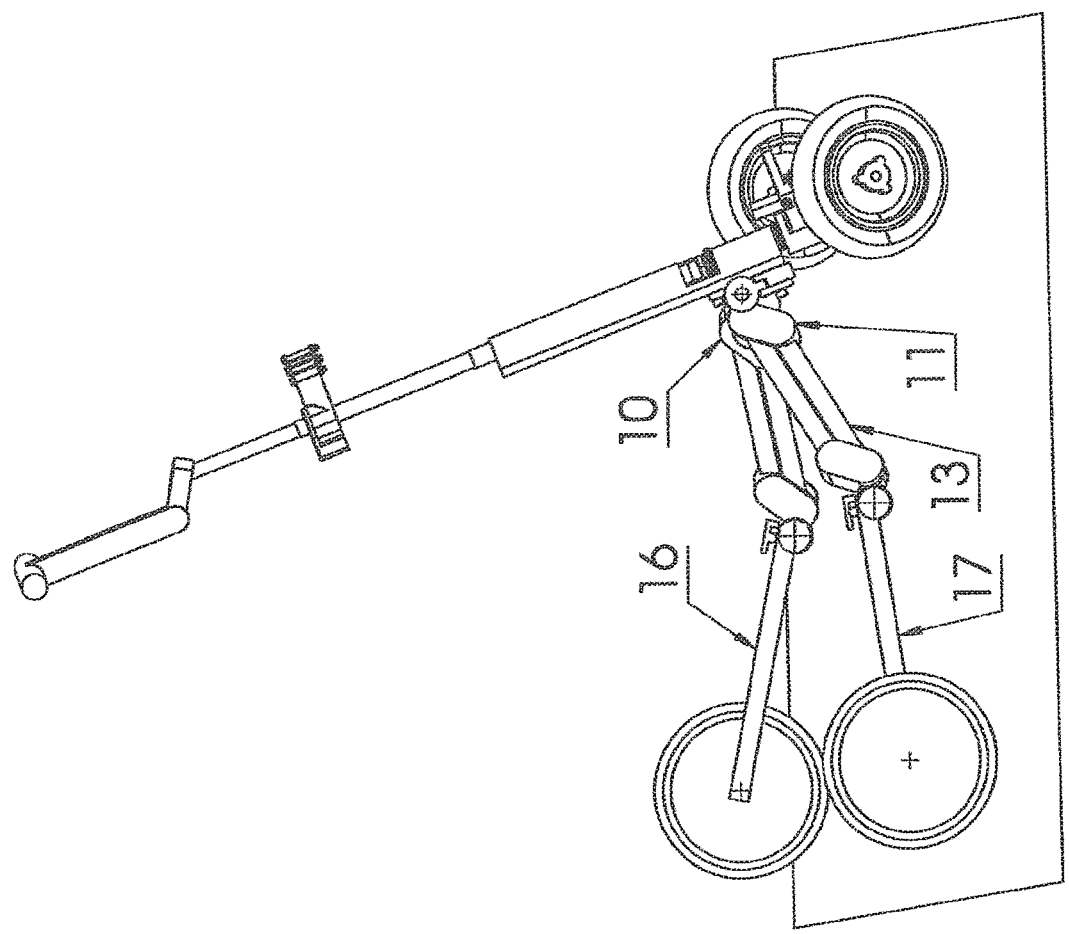
Figure 5:
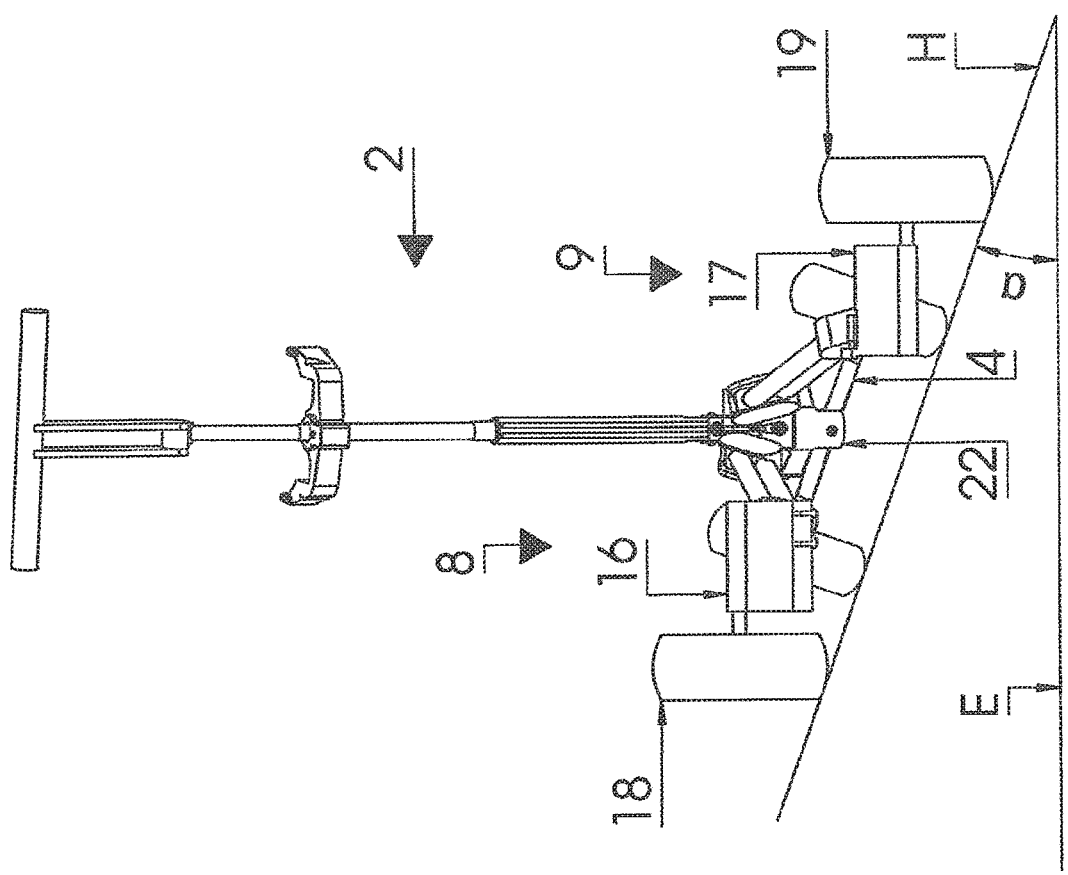
Figure 6:
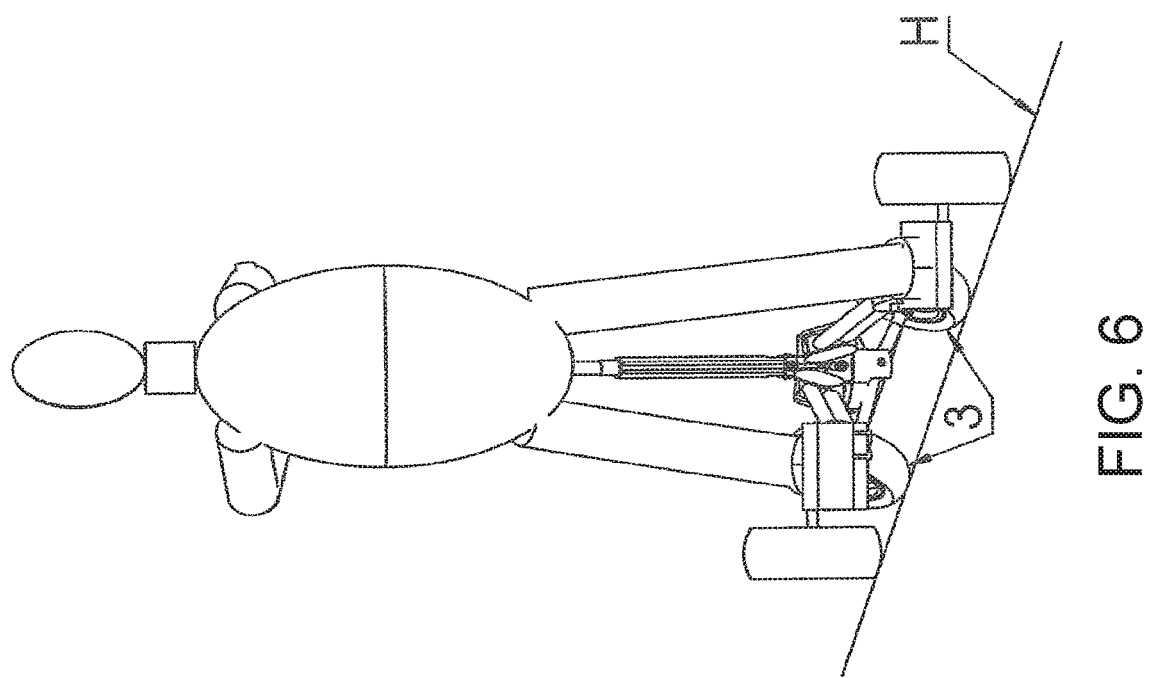
Figure 7:
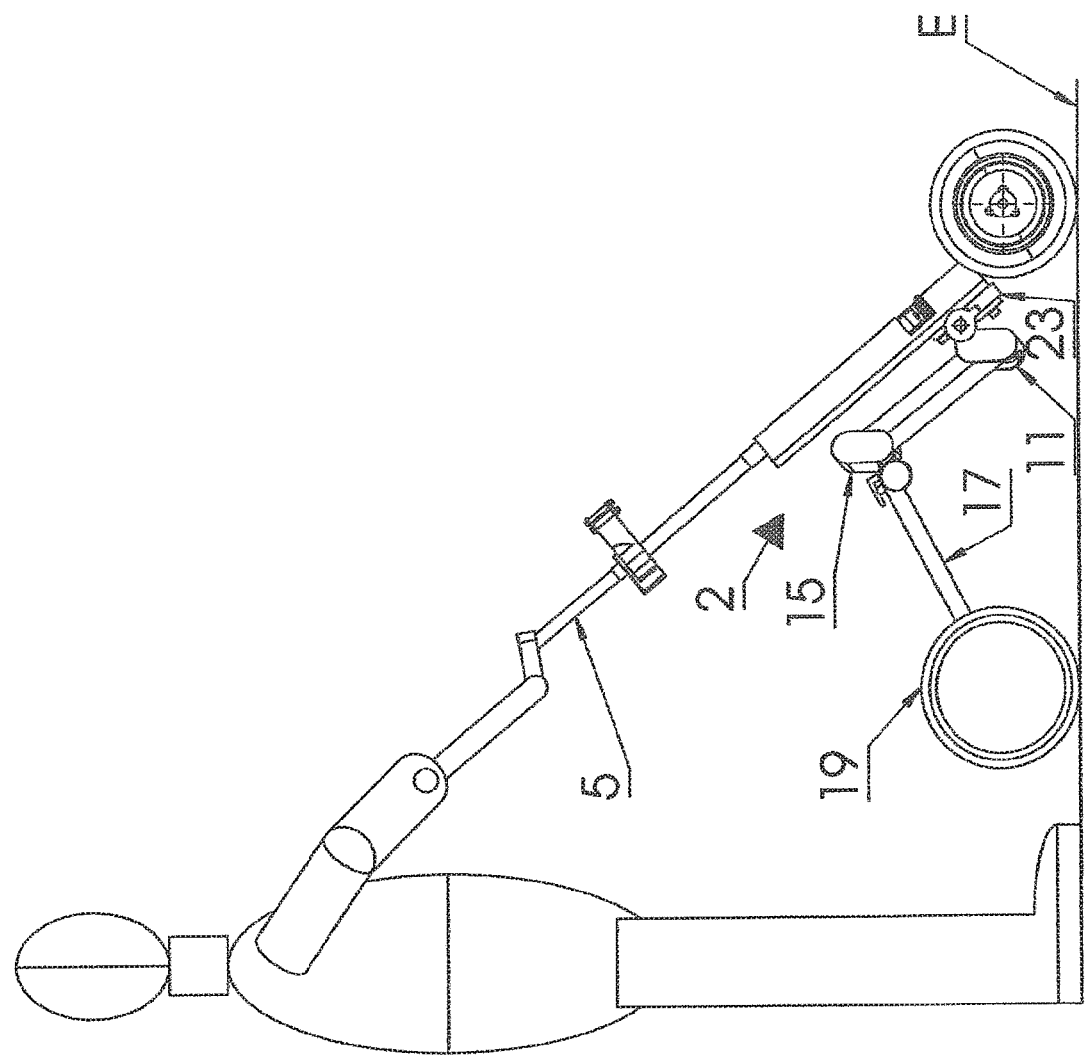
Figure 8:
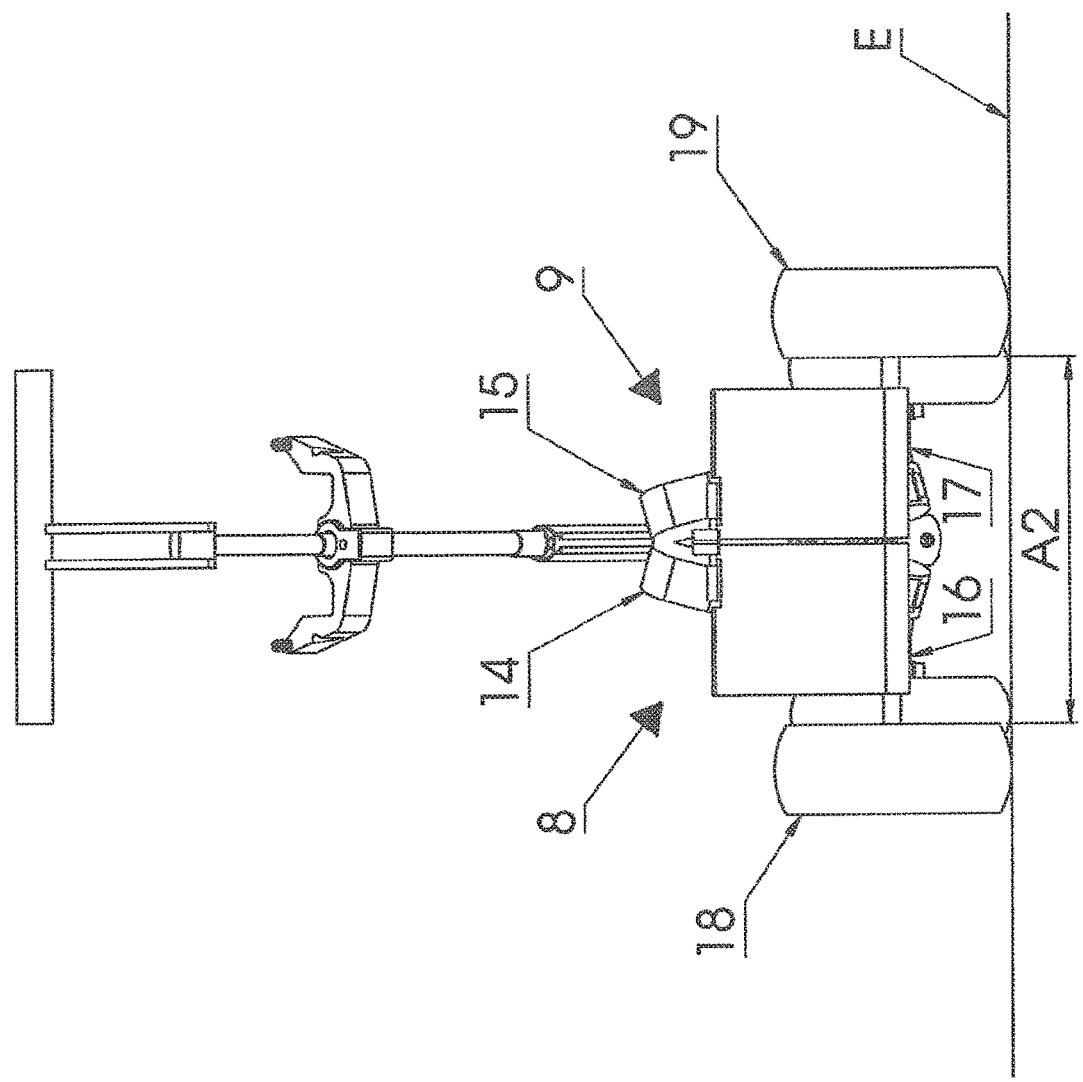
Figure 9:
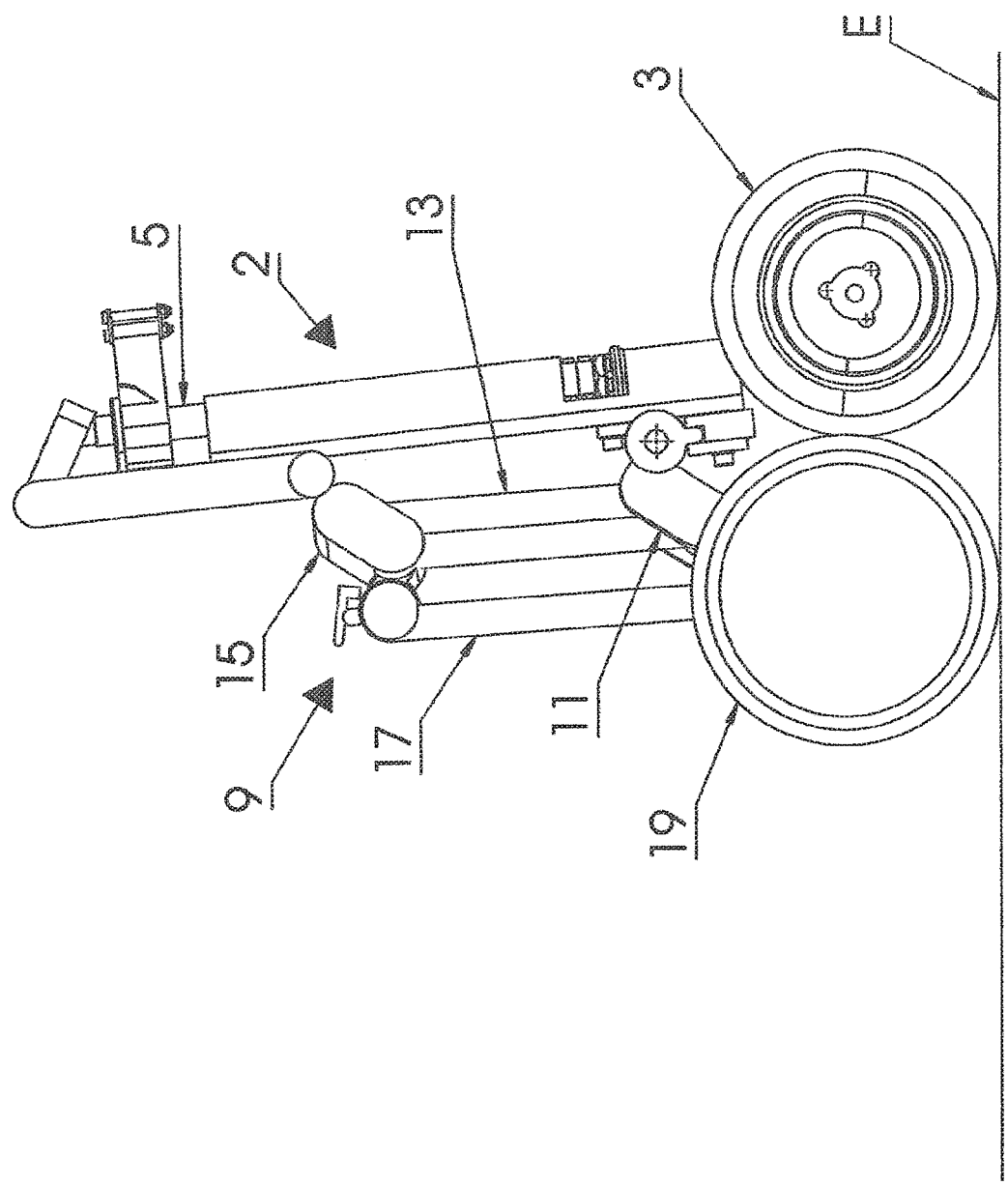
Figure 10:
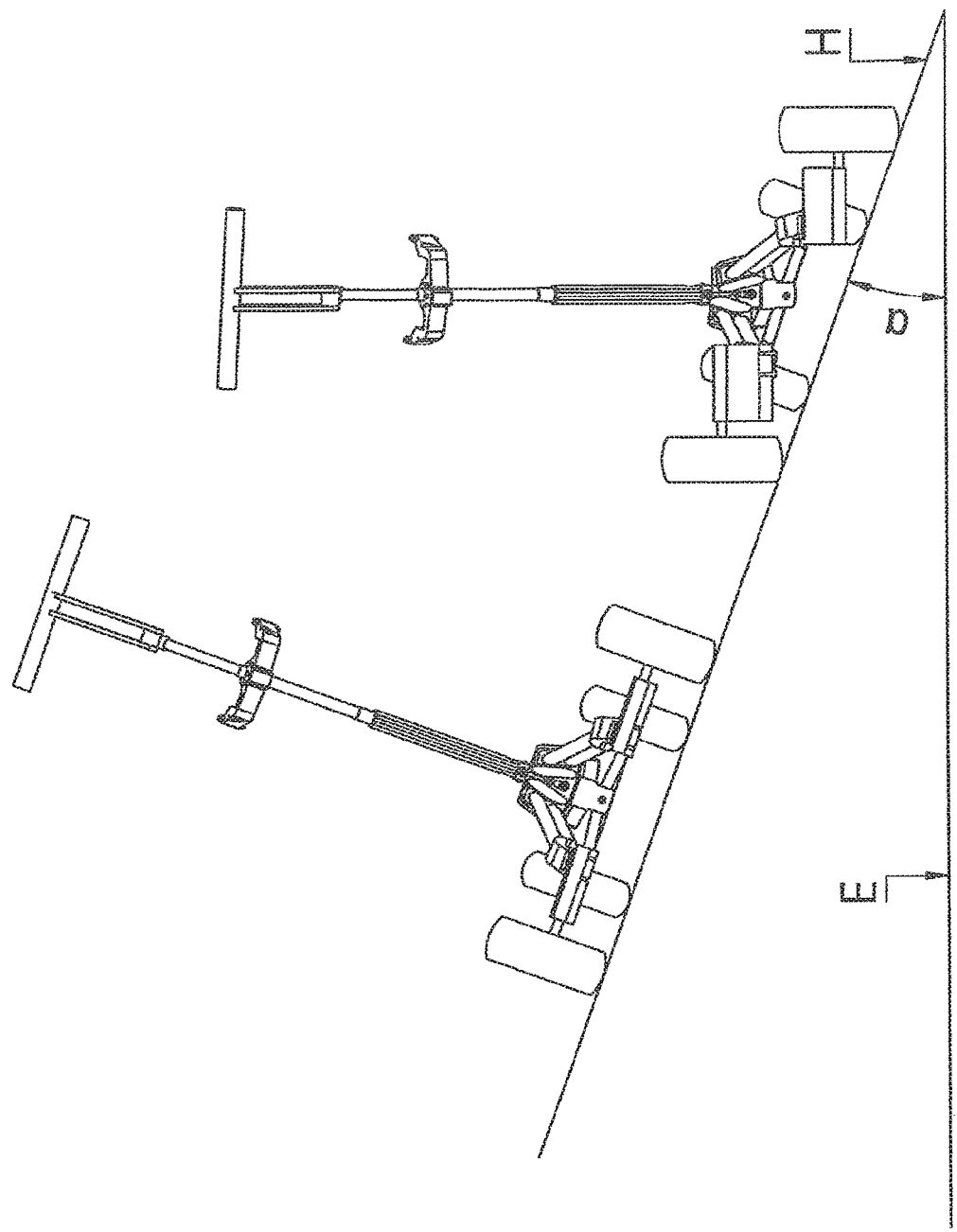
Figure 11:
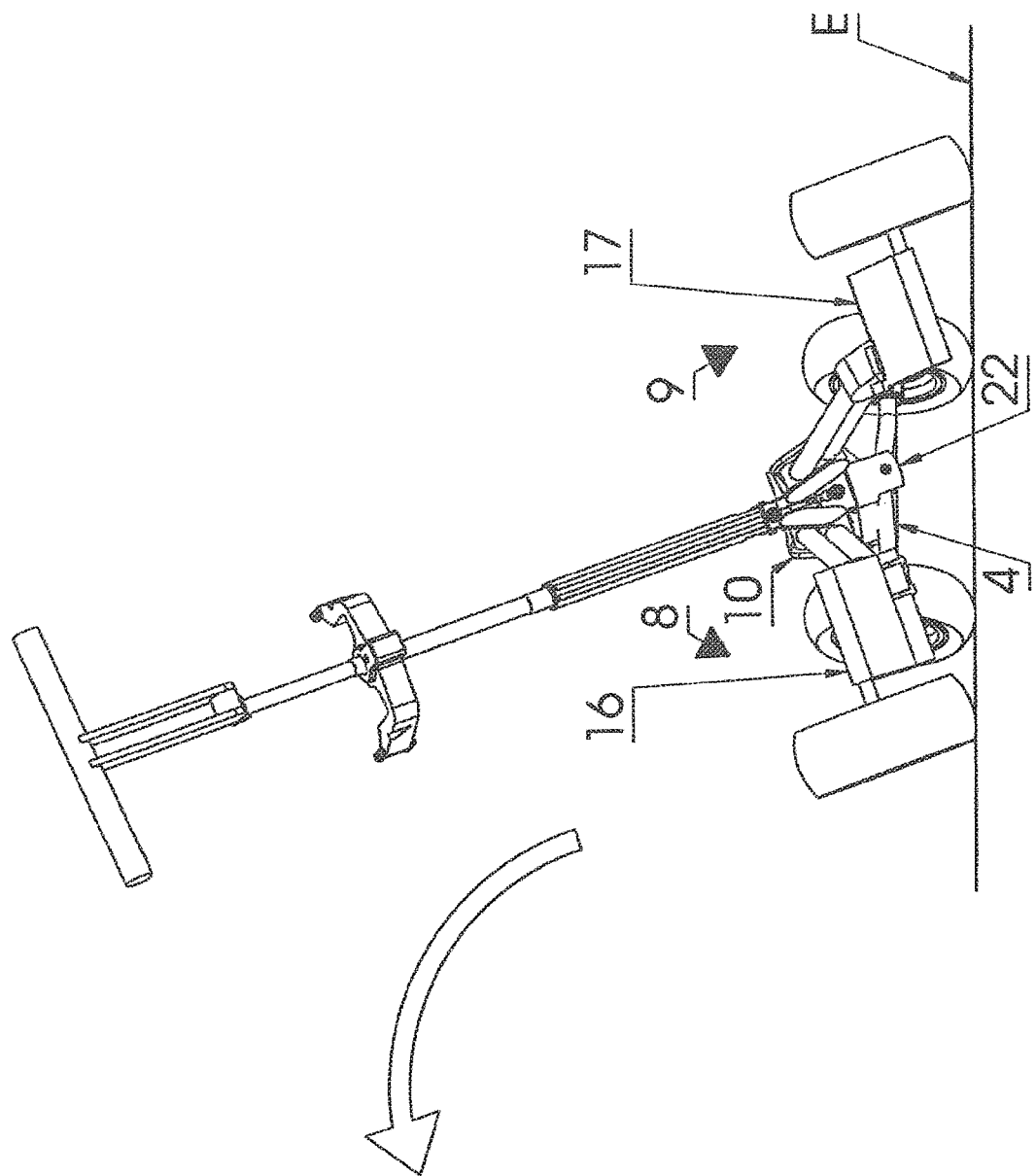
Figure 12:
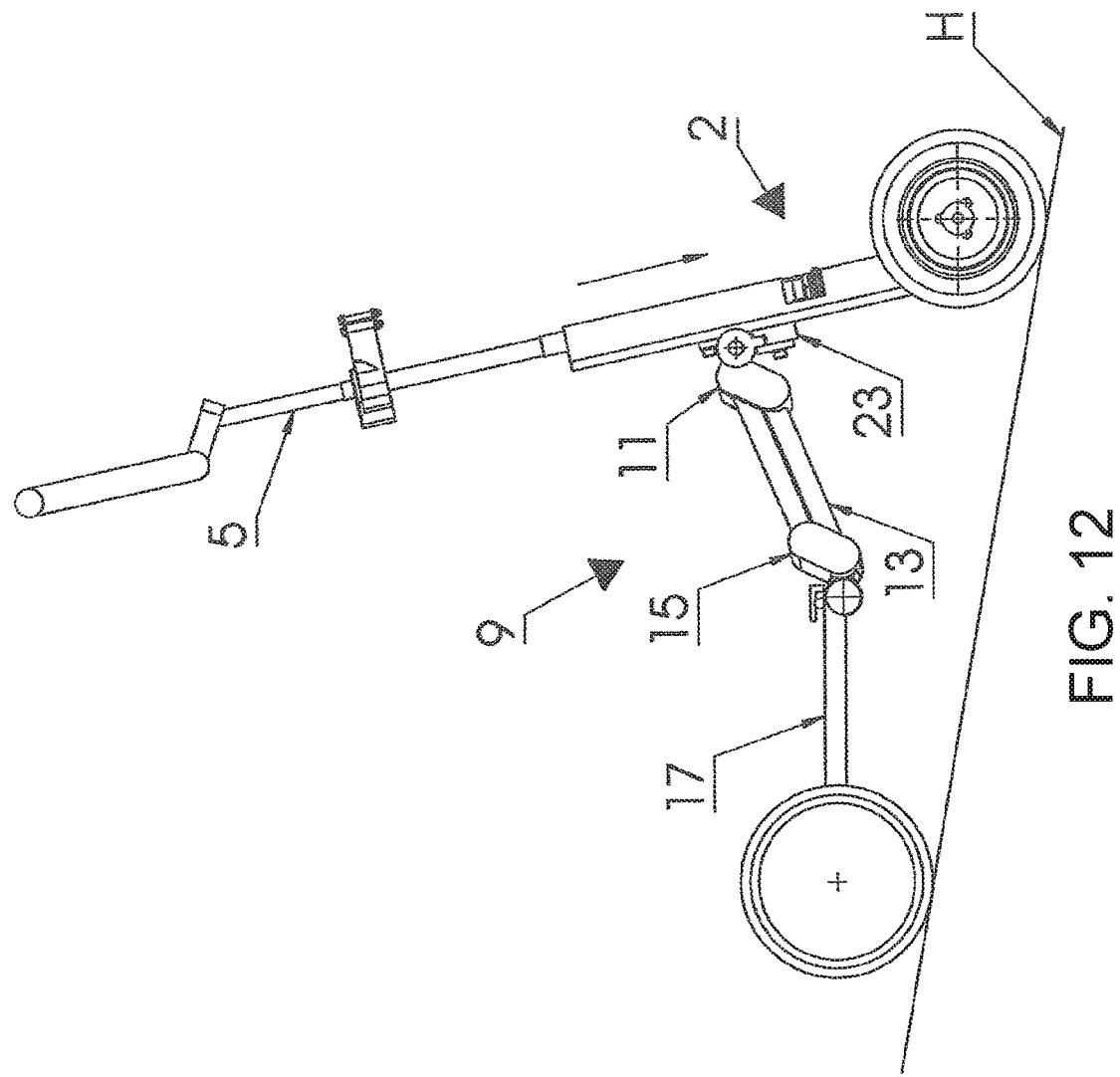
Figure 13:
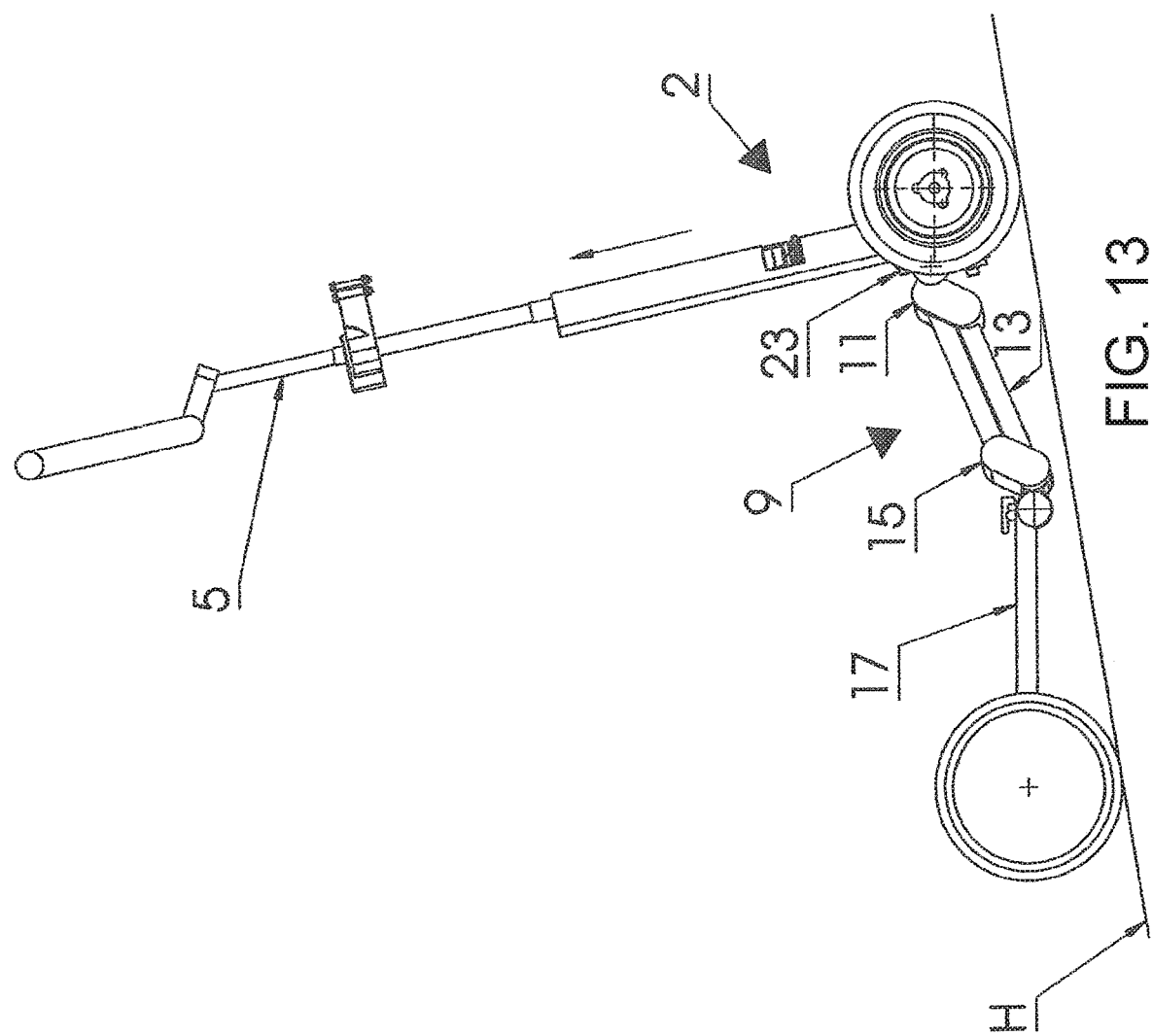
Figure 14:
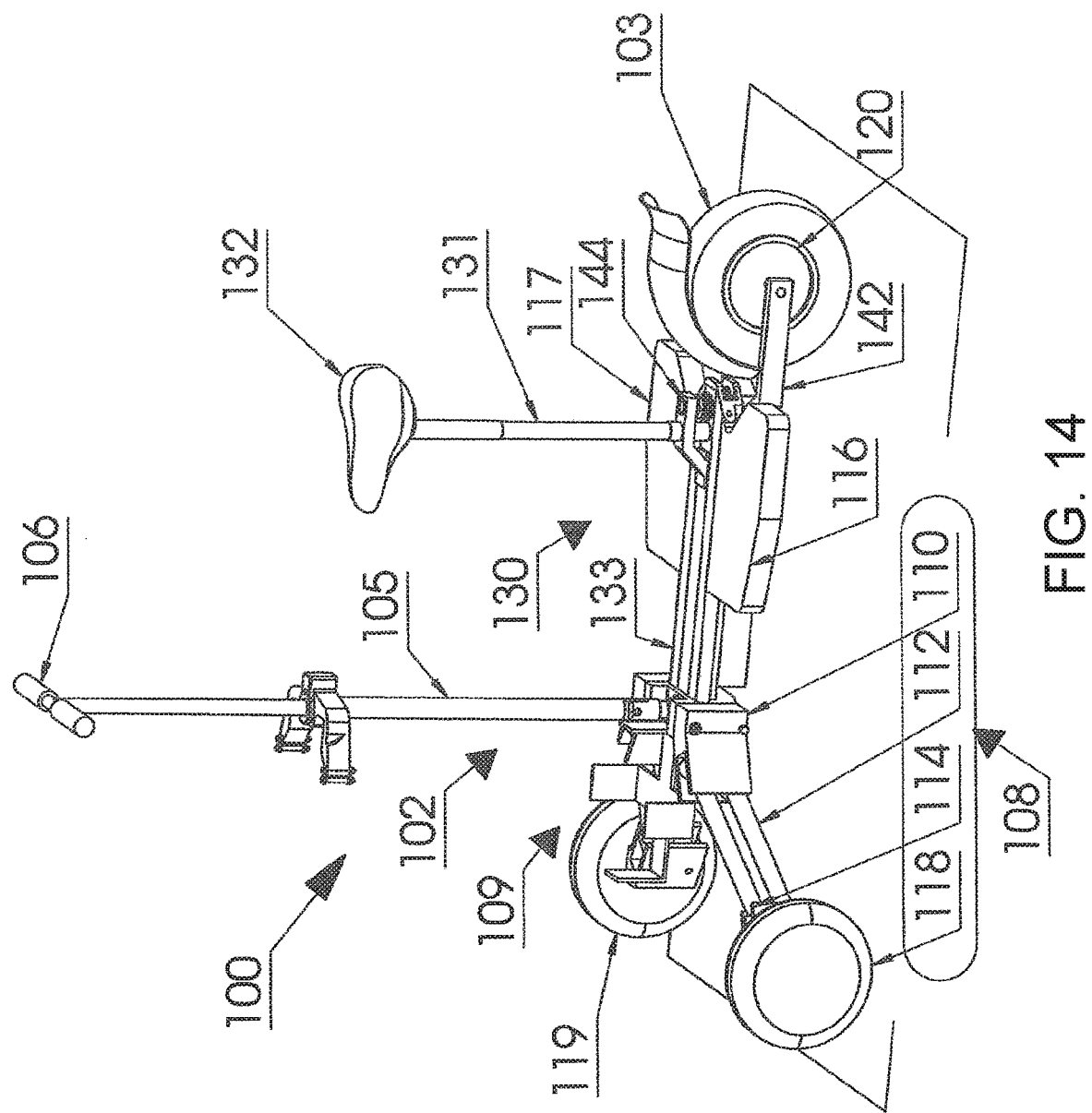
Figure 15:
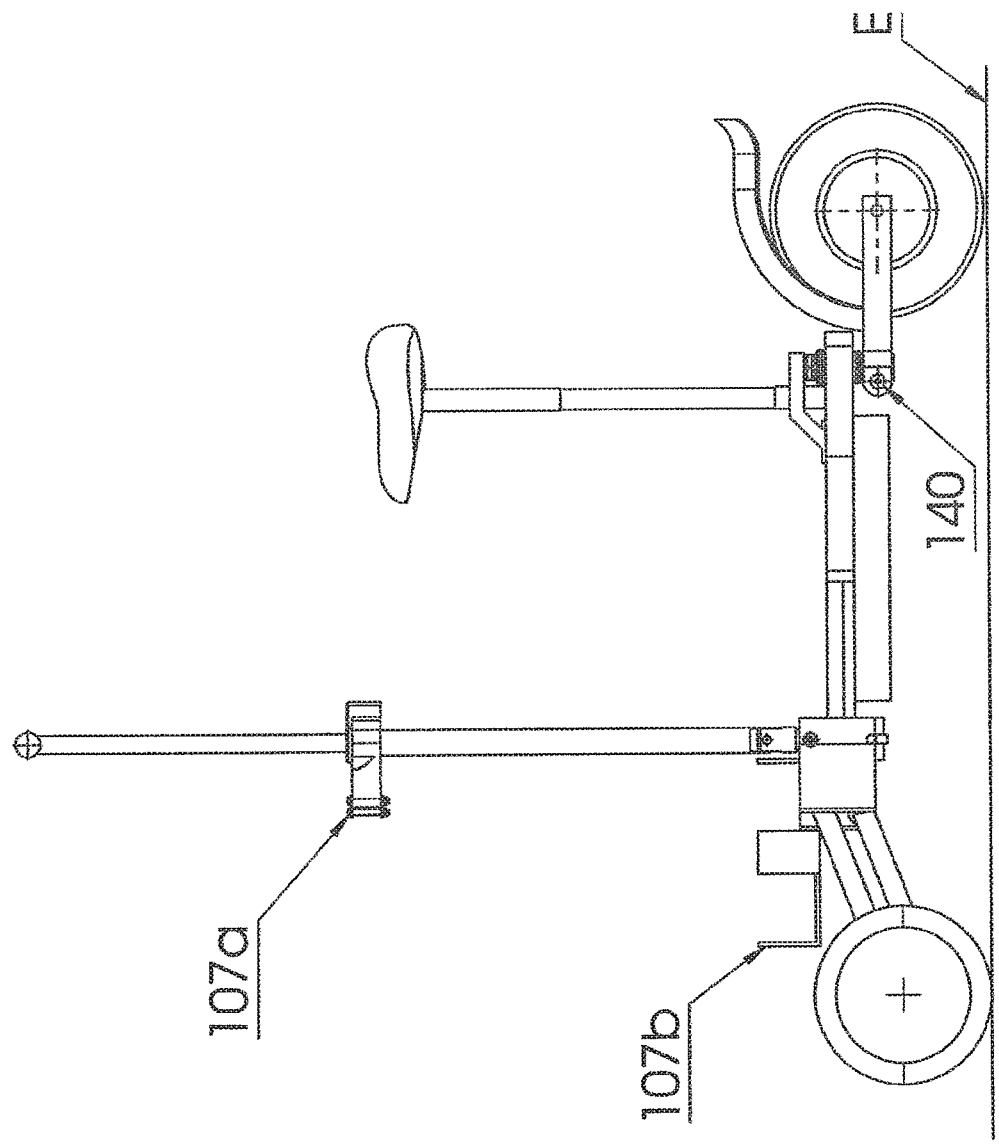
Figure 16:
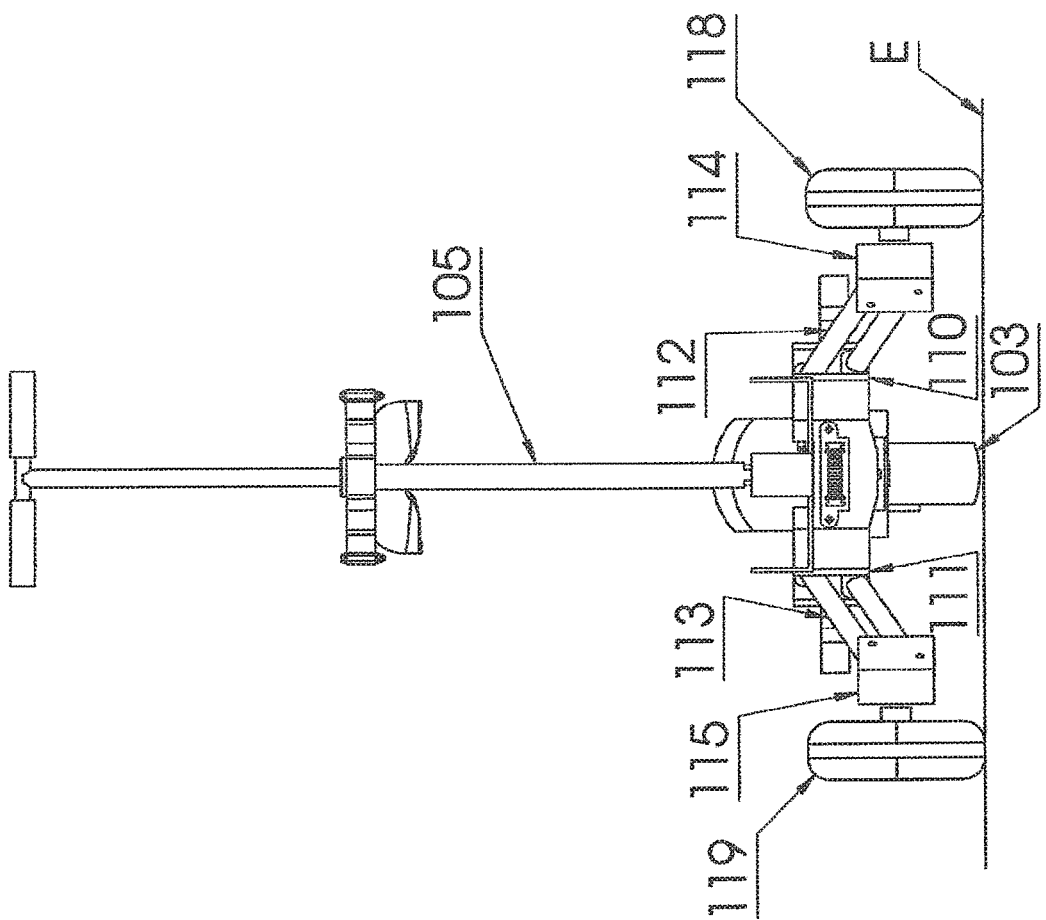
Figure 17:
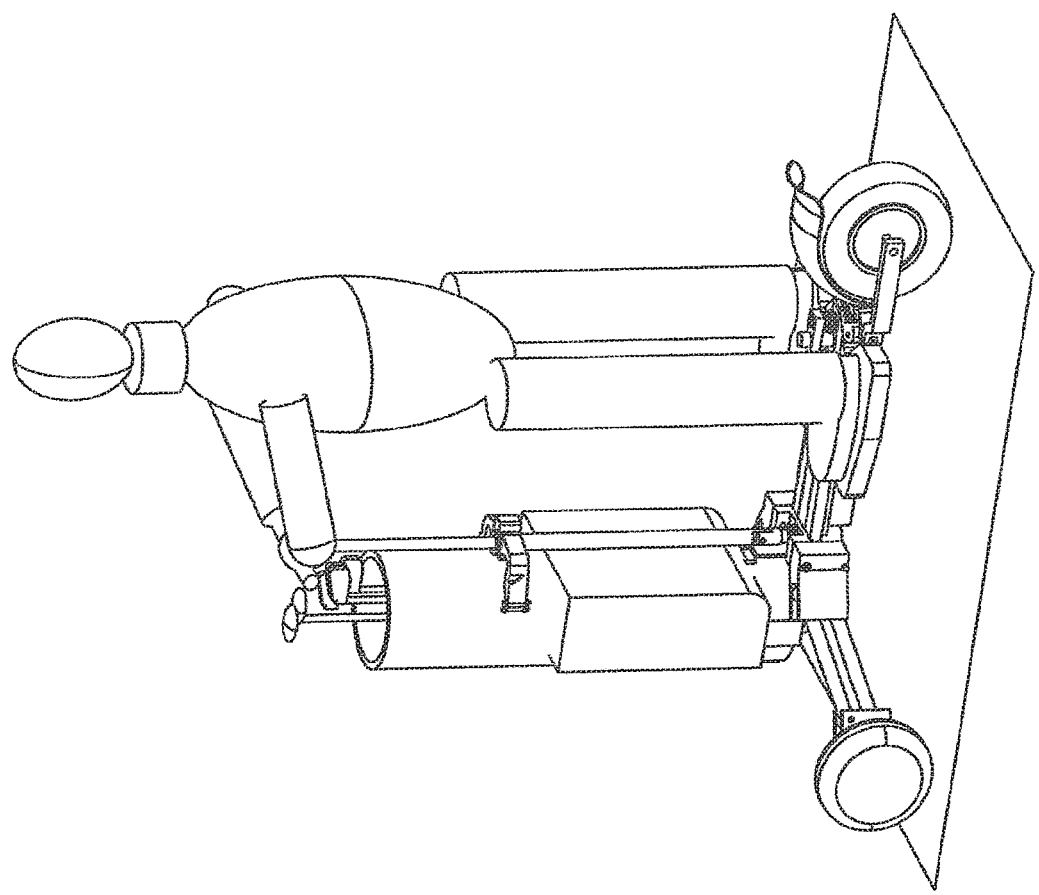
Figure 18:
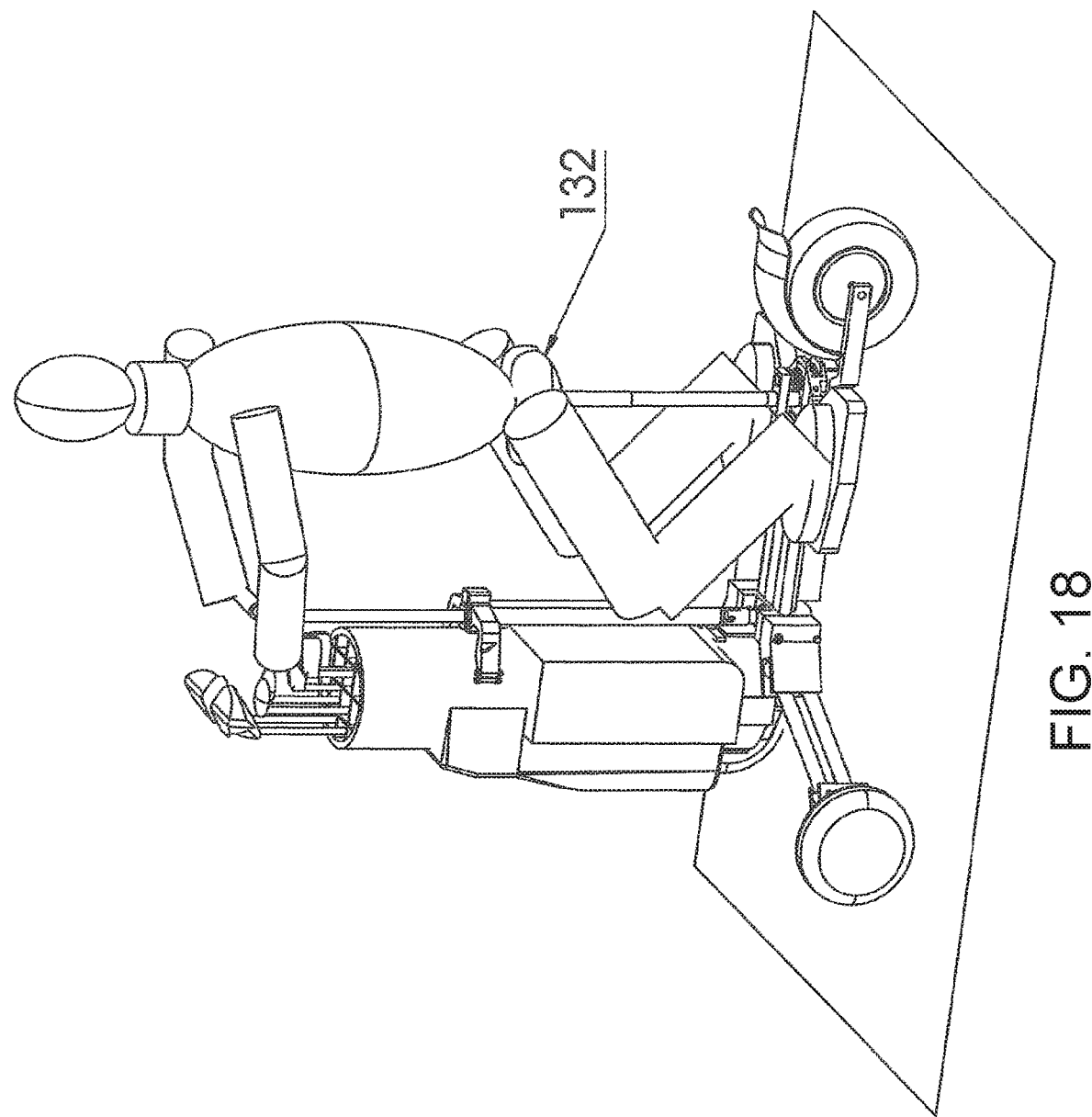
Figure 19:
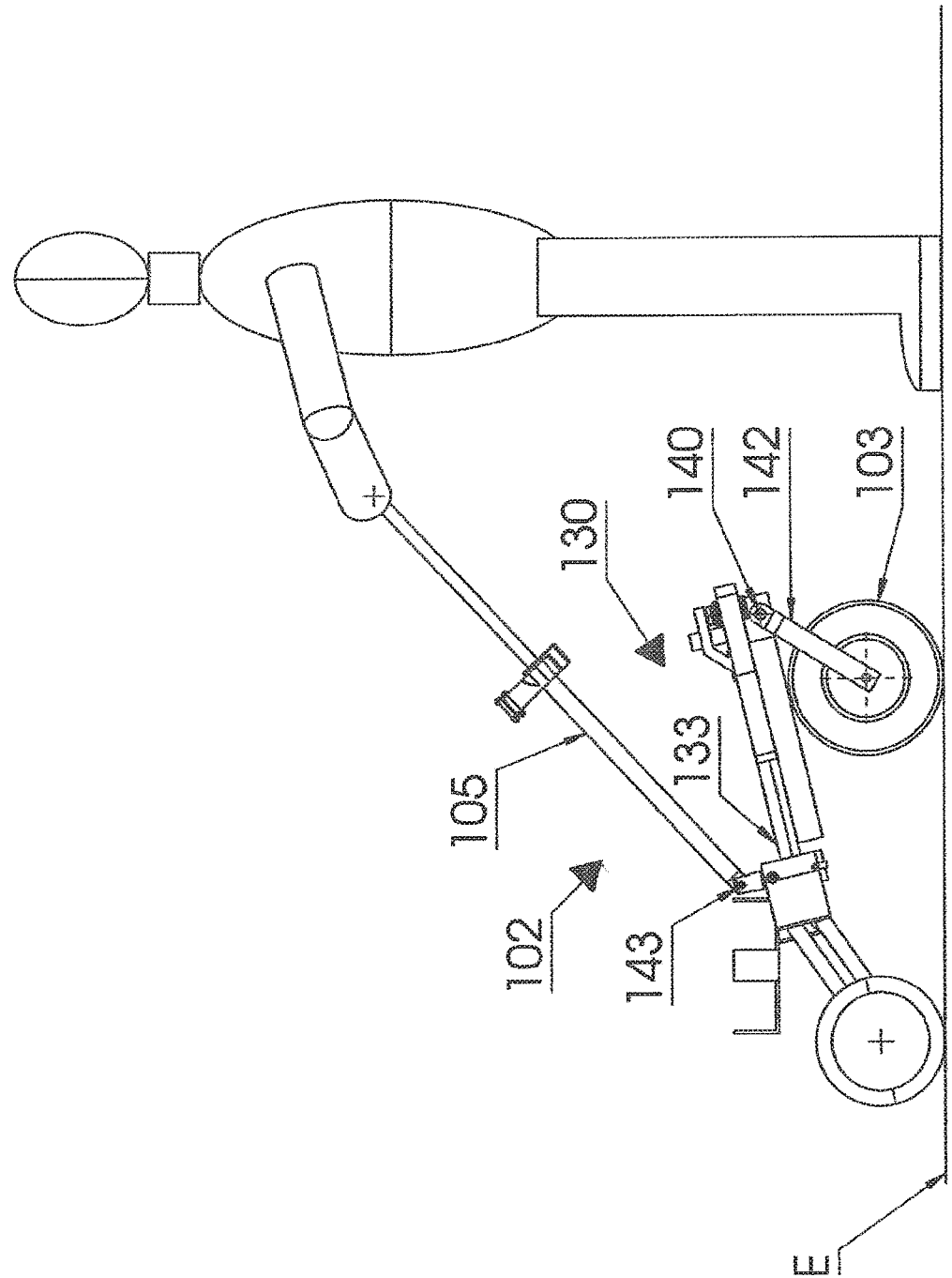
Figure 20:
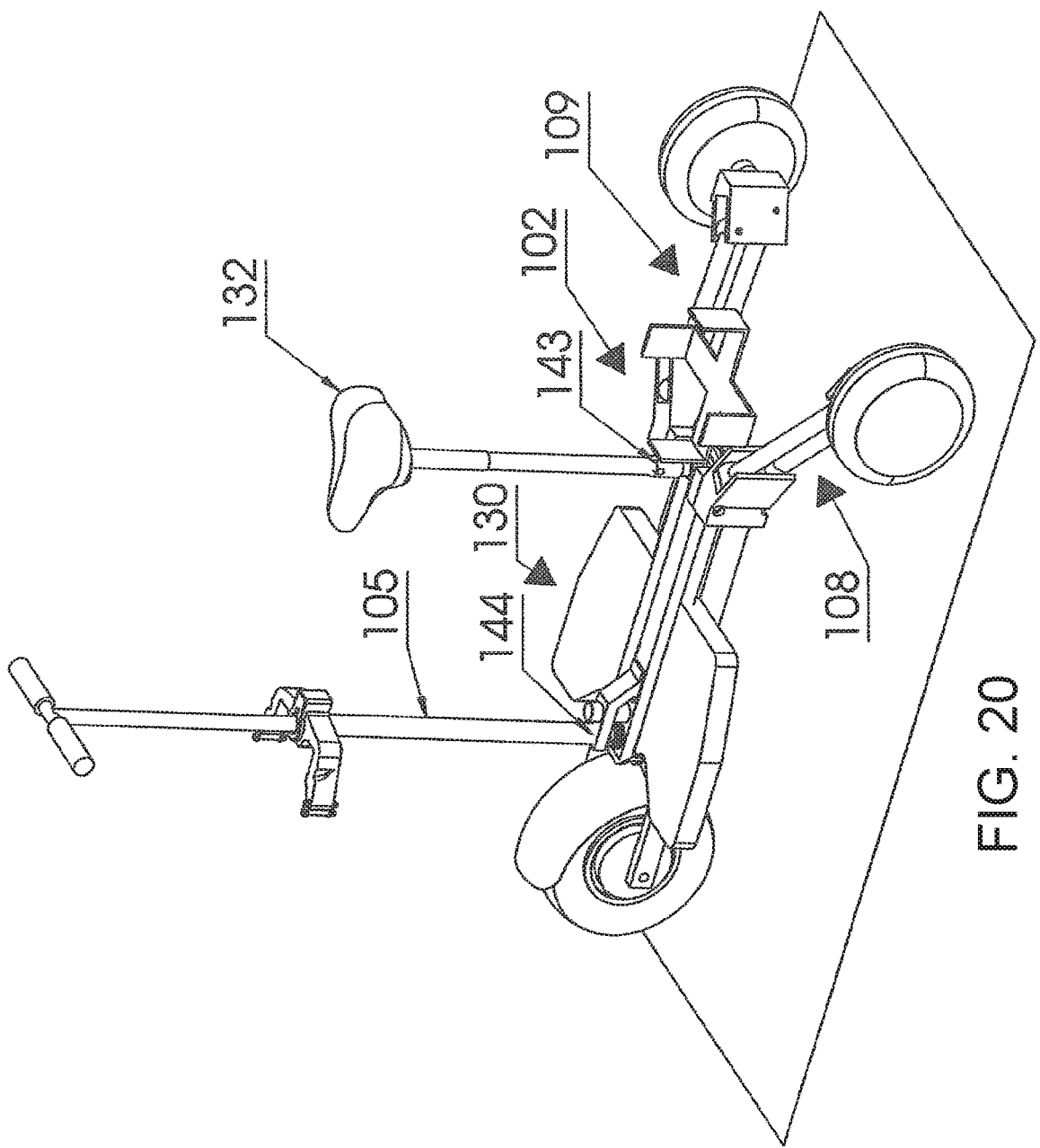
Figure 21:
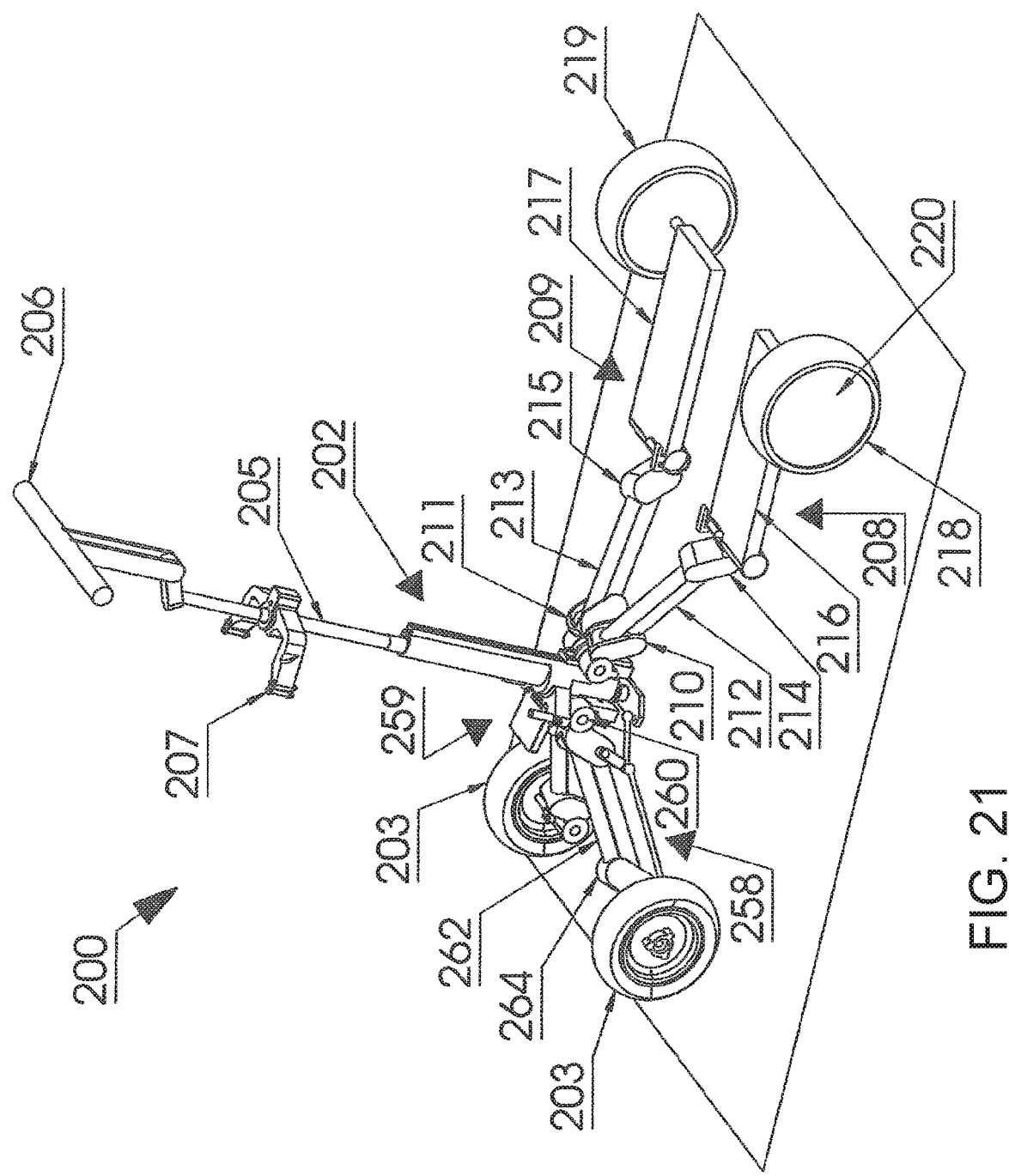
Figure 22:
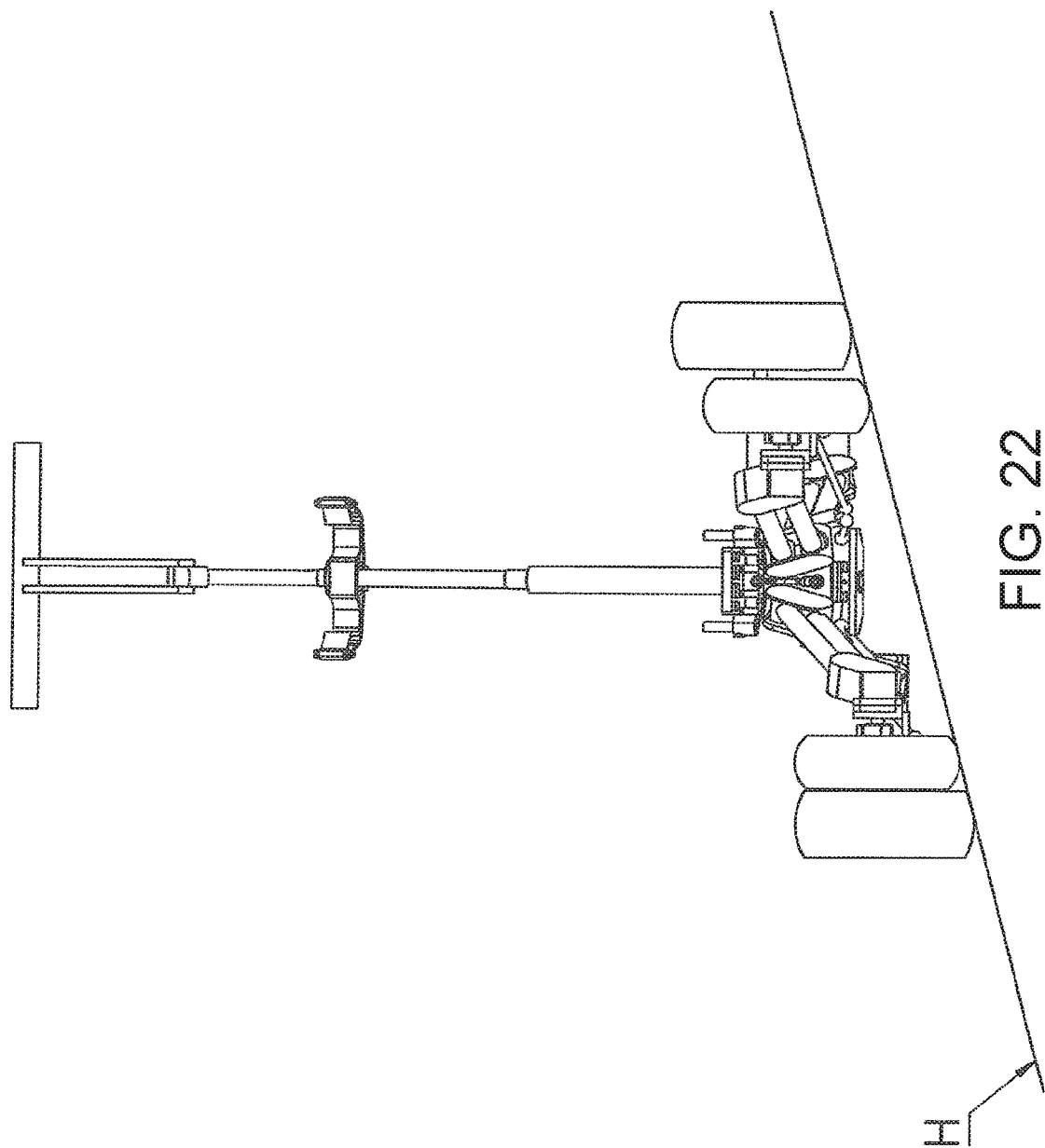
Figure 23:
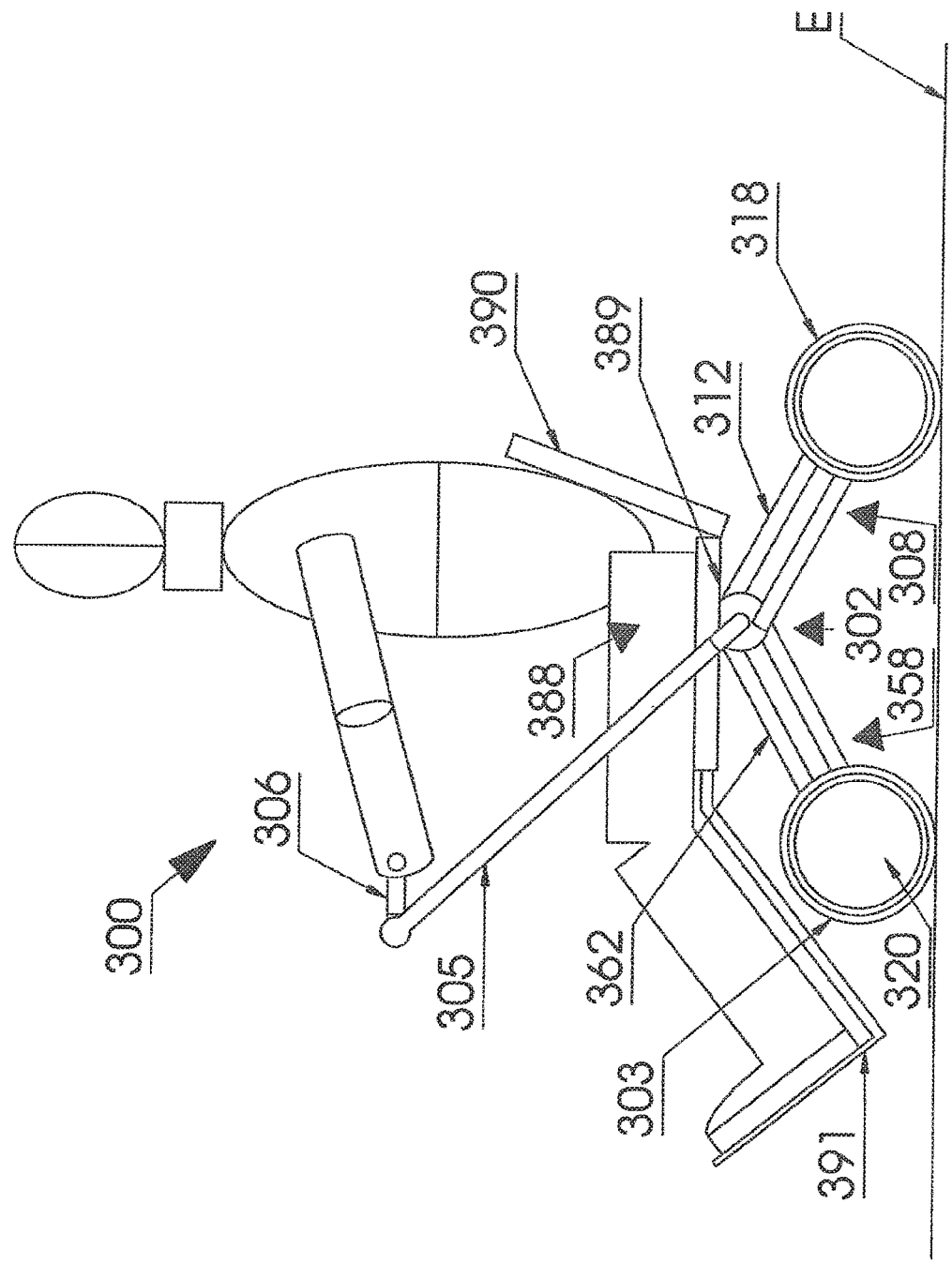
Figure 24:
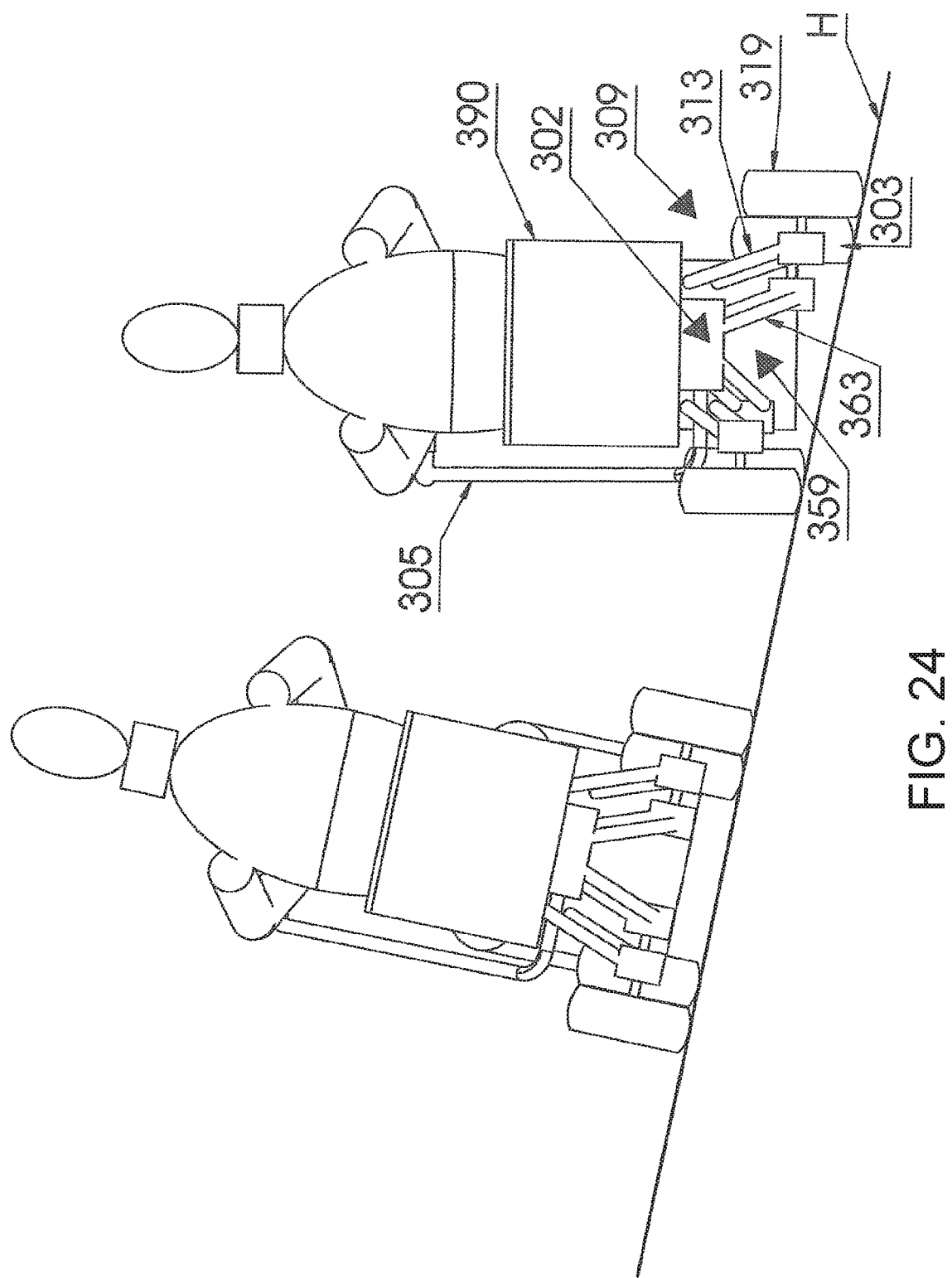
Figure 25:
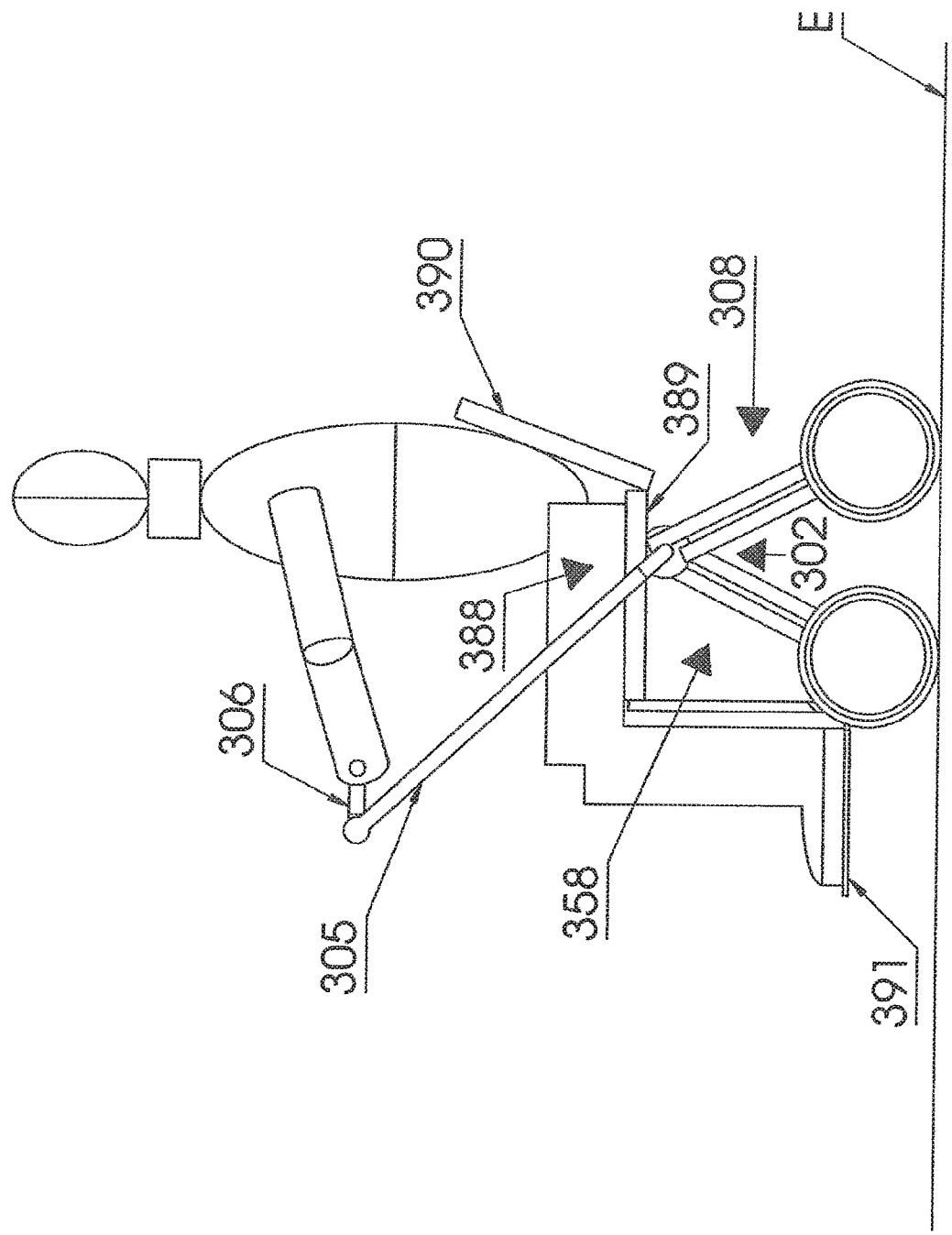
Figure 26:
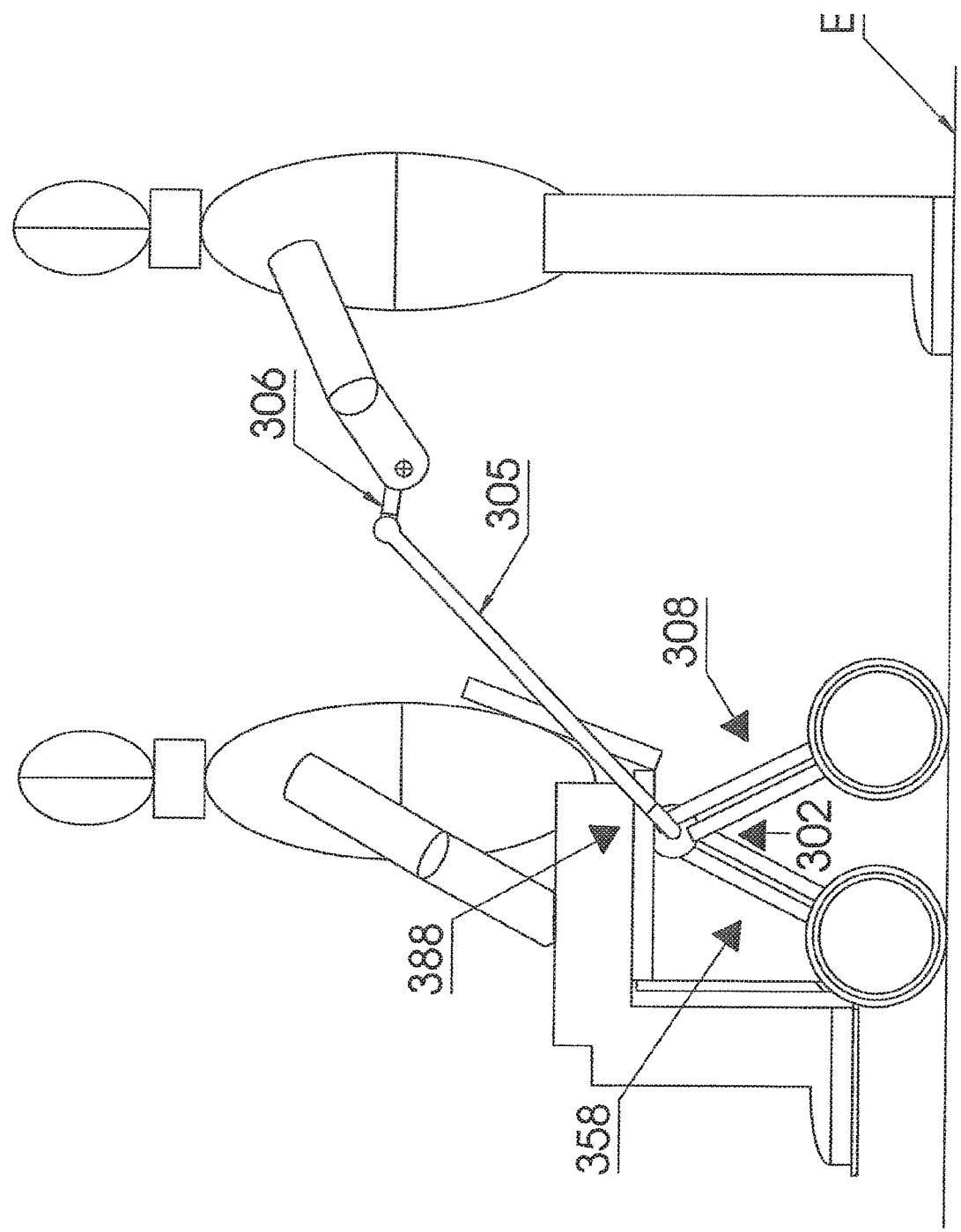

FIG. 1: A perspective view of the vehicle on a side slope;

FIG. 2: A view from the side of the vehicle in the first operating mode during a straight-line drive in a plane, with the user standing thereon;

FIG. 3: A view from the back of the vehicle in the first operating mode in a plane;

FIG. 4: A view from the side of the vehicle in the first operating mode on a side slope;

FIG. 5: A view from the back of the vehicle in the first operating mode on a side slope during a straight-line drive with tilt compensation;

FIG. 6: A view from the back of the vehicle in the first operating mode on a side slope during a curved drive with tilt compensation and standing user;

FIG. 7: A view from the side of the vehicle in the second operating mode in a plane with the user walking behind;

FIG. 8 A view from the back of the vehicle in the second operating mode in a plane;

FIG. 9: A view from the side of the vehicle in the pack mode in the plane;

FIG. 10: A view from the back of the vehicle in the third operating mode, compared to the first operating mode, on a side slope during a straight drive;

FIG. 11: A view from the back of the vehicle in the first operating mode during a curve drive in the plane;

FIG. 12: A view from the side of the vehicle in the first operating mode during a downhill drive with tilt compensation;

FIG. 13: A view from the side of the vehicle in the first operating mode during an uphill drive with tilt compensation;

FIG. 14: A perspective view of a second embodiment of the vehicle in the first operating mode with seat shown;

FIG. 15: A view from the side of a second embodiment of the vehicle in the first operating mode with the seat shown;

FIG. 16: A view from the front of a second embodiment of the vehicle in the first operating mode;

FIG. 17: A perspective view of a second embodiment of the vehicle in the first operating mode with standing user;

FIG. 18: A perspective view of a second embodiment of the vehicle in the first operating mode with sitting user;

FIG. 19: A view from the side of a second embodiment of the vehicle in the second operating mode with the user walking behind;

FIG. 20: A perspective view of a further variation of a second embodiment of the vehicle in the first operating mode;

FIG. 21: A perspective view of a third embodiment of the vehicle in the first operating mode;

FIG. 22: A view from the back of a third embodiment of the vehicle in the first operating mode on a side slope with tilt compensation;

FIG. 23: A view from the side of a fourth embodiment of the vehicle in the first or third operating mode where the user drives while seated in a lowered position;

FIG. 24: A view from the back of a fourth embodiment of the vehicle on a side slope in the third operating mode, compared to the first operating mode;

FIG. 25: A view from the side of a fourth embodiment of the vehicle in the first or third operating mode with the user seated in a raised sitting position;

FIG. 26: A view from the side of a fourth embodiment of the vehicle in the second operating mode with a person sitting thereon and a person walking behind/pushing.

FIGS. 1 to 13 show a first embodiment of the inventive vehicle 1, in various operating modes and vehicle positions.

The vehicle 1 has a first vehicle component 2 which is in the version described herein provided with two wheels 3 on a front axle 4 as a mounting. However, versions having one wheel or more than 2 wheels are conceivable as well.

The first vehicle component 2 furthermore has a steering rod 5, mounted rotating and/or pivoting, with a handlebar 6 attached thereto. The vehicle furthermore has holding devices 7a, 7b for holding at least one transport container (e.g. a golf bag, a shopping bag, etc.), or a walking aid and the like.

A second vehicle component 8 and a third vehicle component 9 are attached via joints 10, 11 to the central joint 23, which is attached to the first vehicle component 2 so as to be alterable in longitudinal direction. Each of the second and third vehicle component respectively comprises a lever linkage 12, 13, an additional joint 14, 15 at which respectively one footboard 16, 17 is attached as a standing surface and with respectively one wheel 18, 19 mounted thereon, which is provided with respectively one motor 20, 21.

FIGS. 2 and 3 show the vehicle 1 in a first operating mode on a plane terrain. In a representation with attached golf bag (FIG. 2), a male/female user stands on the footboards 16, 17 in the first operating mode. The footboards 16, 17 are positioned substantially parallel to the plane E; the two wheels 18, 19 of the footboards are spaced apart by the distance A1.

In the at least first operating mode, the vehicle 1, 100, 200, 300 can be tilted to the side.

FIGS. 4, 5, 6, 10, 22, 24 show various embodiments of the vehicle in the first operating mode, lateral on a slope.

The male/female user or an automatic has moved the at least second and/or third vehicle component 8/9/108/109/208/209/308/309 and/or the fourth and/or fifth vehicle component 258/259/358/359 (FIGS. 22, 24) and/or parts/sub-components thereof, on one side or on both sides evenly or unevenly, at least partially vertical direct or indirect in a lifting, around at least one rotational axis on the first vehicle component 2/102/202/302 in different directions. Thus, several possible suspensions lead to the fact that a male/female user or an automatic can compensate for the tilt on side slopes or inclinations, e.g. at offset planes.

In FIGS. 4 to 6, the vehicle 1 is shown in the first operating mode lateral on a slope, wherein the slope plane H is inclined by the angle α (alpha), relative to the plane E.

As shown, the downhill positioned third vehicle component 9 is in the same position, relative to the first vehicle component 2, as during the drive in the plane E.

For the design shown herein, the footboard 17 of the third vehicle component 9 remains in the position as for the drive in the plane.

The uphill positioned second vehicle component 8 was rotated at least partially vertically upward in the joint 10, wherein the steering rod 5 during a straight-line drive continues to remain in a position relative to the driving direction which essentially corresponds to the drive in the plane.

The front axle 4 was rotated around a joint 22 by the angle α, relative to the steering rod 5, so that it is positioned parallel to the slope plane H.

When driving with the vehicle 1 in the first operating mode in the plane E (FIG. 11), or lateral on a slope H (FIG. 6) around a curve, the at least one male/female user or an automatic can move the at least second and/or third vehicle component 8, 9, which is respectively positioned on the curve inside and/or the curve outside, around its respective joint 10, 11 so that the at least one male/female user stands in a considerably more comfortable position with respect to the centrifugal forces during the curve drive than if the at least second and/or third vehicle component 8, 9 would be fixed or locked in place, relative to the first vehicle component 2.

In the example shown in FIG. 11, the vehicle 1 is driving in the first operating mode around a left-hand curve. The second vehicle component 8 was tilted around the joint 10, the front axle 4 was also tilted in the joint 22.

In FIGS. 7, 8 as well as 19 and 26, the vehicle 1, 100 and 300 is shown in a first, second and fourth embodiment in a second operating mode, in which the at least one male/female user or a second person walks behind or beside the vehicle 1 respectively 2 or 4 and either steers the vehicle while it moves automatically driven, or pushes it while it is in neutral gear. The vehicles 1, 100, 200, 300 can also be used while in neutral gear. In the second operating mode, at least two vehicle components and/or parts/sub-components thereof are located in a position, relative to each other, different as compared to the position in at least the first operating mode, so that a change in the position of the steering rod and/or other vehicle components, for example, results in a vehicle condition that is conducive to pushing. In FIG. 7, for example, the steering rod is tilted backwards in the second operating mode as compared to the first operating mode.

In this second operating mode, the vehicle 1 can also be used respectively moved along at locations where the driving in the at least first operating mode is not possible, for example beside the green of a golf course or on the inside of a supermarket building. Here, the vehicle 1 has a more compact form than in the first operating mode, which is adjusted by folding at least the second and third vehicle component 8, 9 around the four joints 10, 11 and 14, 15 in the direction of the first vehicle component 2. Hereby, the vehicle length is shorter than in the first operating mode (FIG. 7).

As shown in particular in FIG. 8, additionally a spacing A2 between the two wheels 18, 19 is adjusted through this, which is less than the spacing A1 in the first operating mode (see also FIG. 3). This shorter distance between the two wheels 18, 19 in this embodiment/design also results on the whole in a smaller width of the vehicle 1 than in the first operating mode, which allows pushing respectively steering the vehicle between shelves of a store or between two boundary posts.

The vehicle 1 can also have one/several mechanical device(s) and/or one/several drive(s), thus allowing an automatic or remote control transition from one operating mode to another operating mode, and/or one operating mode to the pack mode, and/or vice versa, and/or the change in the seat height, and/or the vehicle height, and/or the vehicle length, and/or the vehicle width.

FIG. 9 shows the vehicle 1 in the pack mode, in which it can be stowed, for example, in the trunk of an automobile. In the pack mode, the wheels 18, 19 are closer to the first vehicle component 2 than at least in the first and/or second operating mode. For this, the second and the third vehicle component 8, 9 are folded around the joints 10, 11 and 14, 15 so far in the direction of the first vehicle component 2, that the lever linkages 12, 13 as well as the footboards 16, 17 are each essentially in a parallel position to the steering rod 5, thus resulting in a more compact size than in the at least first and/or second operating mode. Providing at least one additional stand (not shown), can support a more stable standing of the vehicle 1 in the pack mode.

For transport, the vehicle 1 can further be provided with at least one device for attaching it at the trailer hitch of an automobile.

FIG. 10 shows on the left an advantageous embodiment of the vehicle 1, which comprises a pre-selectable additional third operating mode in which the joints 10, 11, 14, 15 are locked by pre-selection of at least one male/female user or an automatic. This mode optionally allows operating the vehicle in such a way that it corresponds to the operating principle of known vehicles. The standing surfaces on the footboards are in this case essentially in a position parallel to the slope.

The comparison with the vehicle 1, positioned on the right, in the first operating mode shows that in the first operating mode, a calm, stable body position can be taken above the vehicle, with an advantageous standing position, while in the third operating mode the vehicle has an uncomfortable tendency to tilt.

In FIGS. 12 and 13, the vehicle 1 is in the first or third operating mode in a downhill/uphill position in which the inclination of the descent (FIG. 12) respectively the ascent (FIG. 13) was compensated automatically by corresponding mechanical means and drives as well as at least one tilt sensor. In doing so, the first vehicle component 2 has changed in its position at the central joint 23, in the direction of the arrow respectively shown in the downhill position (FIG. 12) or the uphill position (FIG. 13). The tilt compensation could occur via the joints 10, 11, 14, 15 and the lever linkages 12, 13; as well other designs are conceivable too.

For additional safety during an uphill drive with corresponding ascent, the danger of tilting backwards can be reduced substantially with at least one additional support wheel (not shown) at the at least second and/or third vehicle component 8, 9.

In the embodiment shown in FIGS. 1 to 13, the vehicle 1 has two motors 20, 21 in the wheel hubs of the wheels 18, 19 which can be driven electrically via one or several accumulator(s) (not shown) and one or several electronic control(s) (not shown). However, the vehicle can also be provided with several motors/drivable wheels, e.g. in an all-wheel version. Other drive means can also be used, such as a combustion engine, a single electric motor, or more than two electric motors, or muscle power via pedals according to the bicycle principle.

The vehicle 1 can also be used as towing vehicle in that it is provided with one or several towing devices for attaching trailers.

For the transport, it is possible to remove the wheels, the motors as well as other parts, e.g. the footboards with the accumulators, in order to reduce the weight to be lifted, for example during the loading into the trunk of an automobile.

FIGS. 14 to 19 show a vehicle 100 representing a second embodiment of the inventive vehicle.

Analogous to the vehicle 1, the vehicle 100 has a first vehicle component 102 with a rotatable and/or pivotable mounted steering rod 105 with a handlebar 106 located thereon. The first vehicle component 102 additionally comprises one or several holding devices 107a, 107b for holding at least one transport container (e.g. golf bag, shopping bag, etc.) or a walking aid or the like, or also several footboards and/or seating surfaces for additional persons.

Further analogous, the vehicle 100 comprises a second vehicle component 108 with two joints 110 and 114, a lever linkage 112 mounted in-between, a wheel 118, as well as a third vehicle component 109 with two joints 111 and 115, a lever linkage 113 mounted in-between, and a wheel 119. The second and third vehicle components 108, 109 of this embodiment are arranged in driving direction laterally at the front left and right of the first vehicle component 102.

The steerable wheel 103 is located at a fourth vehicle component 130, consisting of two sub-components 133 and 142, which are connected by a joint 140. For this, the steering movement is transmitted from the handlebar 106 via the steering rod 105 and a mechanical system, for example, a crisscrossed chain or belt, meaning indirectly to the wheel 103. Furthermore, the wheel 103 can be driven via the motor 120, respectively the vehicle can be operated with several motors, e.g. for an all-wheel version.

Footboards 116, 117 one which at least one male/female user places the feet at least in the first and/or third operating mode are also located on the fourth vehicle component 130.

At least one seat bar 131 with at least one seating option 132 can additionally be installed on the fourth vehicle component.

The vehicle 100 in the second embodiment comprises a first, a second and in an advantageous version a third operating mode, as well as further advantageously a pack mode analogue to the one of the vehicle 1 of the first embodiment.

In the first adjustable operating mode, the vehicle 100 functions in the same way as in the first embodiment, wherein the at least one male/female user or an automatic can move at least on a side slope as well as in inclines, e.g. at offset planes respectively during curve drive, the at least second and/or third vehicle component 108 respectively 109, positioned, uphill and/or downhill respectively on the curve inside and/or curve outside, around the joint 110 respectively 111 at the first vehicle component 102, at least partially vertical, by that also the carving effect is created. In doing so, the at least one male/female user can stand on the footboards 116 and 117 or can be seated on the seat 132, see FIGS. 15 and 16 with golf bag shown.

The vehicle 100 can also be provided with one/several mechanical device(s) and/or one/several drive(s), which permit the transition from one operating mode to another operating mode, and/or from an operating mode to the pack mode, and/or vice versa, and/or for changing the seat height, and/or the vehicle height, and/or the vehicle length, and/or the vehicle width, automatically and/or via remote control. Providing at least one mechanical device and/or at least one drive supported by an electronic control as well as additional tilt sensors enables at least in the first operating mode the automatic tilt adaption of vehicle components and/or parts/sub-components thereof to the ascent respectively the descent, at least during uphill/downhill drives and/or on side slopes as well as in inclined positions, e.g. at offset planes.

Furthermore, the length of the fourth vehicle component 130 is shortened in the second adjustable operating mode, once the sub-component 142 has been folded around the joint 140 and against the sub-component 133 (see FIG. 19). Additionally, the steering rod 105 was folded around the joint 143 at the first vehicle component 102, in the direction of the component 133, so that the male/female user can walk behind or beside the vehicle 100, either to steer the vehicle while the vehicle 100 moves driven automatically, or to push it while it is in neutral gear, e.g. if driving in the ride-along mode is not possible and/or not allowed, due to local conditions. The vehicles 1, 100, 200, 300 can also be used while in neutral gear.

Here too, a third operating mode can be adjusted in a favorable version, in which the second and third vehicle components 108, 109 are secured in a fixed position in the joints 110, 111 at the first vehicle component 102.

In the pack mode, the vehicle 100 is folded up analogous to the first embodiment, wherein additionally the optional seat bar 131 can be folded. Also for the second embodiment, the option exists to remove individual components for transport. FIG. 19 shows a version without a seating bar.

The vehicle 100 in the second embodiment comprises analogue to the first embodiment the same equipment.

FIG. 20 shows a different design of the second embodiment of the inventive vehicle. Here, the position of the steering rod 105 has been changed from the bearing 143 of the vehicle component 102 to the bearing 144 of the fourth vehicle component 130, in a way that the vehicle can be used in the opposite direction. In this configuration also the seat 132 changes its position, which is now in the bearing 143.

Also in this design, the vehicle is provided with the same equipment analog to the described second embodiment.

FIGS. 21 and 22 show a vehicle 200, which represents a third embodiment of the inventive vehicle.

Analogous to the vehicle 1, the vehicle 200 comprises a first vehicle component 202 with a steering rod 205, mounted rotating and/or pivoting, and thereto attached a handlebar 206. Additionally, one or more holding devices 207 for holding at least one transport container (e.g. a golf bag, a shopping bag, etc.) or a walking aid and the like, or also additional footboards and/or seating surfaces for additional persons, are located at the first vehicle component 202.

The vehicle 200 furthermore analogous comprises a second vehicle component 208 with two joints 210 and 214, having a lever linkage 212 mounted in-between, a footboard 216, a wheel 218, as well as a third vehicle component 209 with two joints 211 and 215 and a lever linkage 213 mounted in-between, a footboard 217 and a wheel 219. The second and the third vehicle component 208, 209 in this embodiment are positioned analogous to the vehicle 1 at the first vehicle component 202, in driving direction at the rear.

Furthermore, a fourth vehicle component 258 with two joints 260 and 264 a lever linkage 262 mounted in-between, and a steerable wheel 203, as well as a fifth vehicle component 259 with two joints 261 and 265 a lever linkage 263 mounted in-between, and a steerable wheel 203 are located on the first vehicle component 202. The fourth and fifth vehicle component 258, 259 are located in driving direction on the front of the first vehicle component 202.

The steering movement is transmitted from the handlebar 206 via the steering rod 205 to the wheels 203. In addition, the wheels 203 can be driven via the motors 220, 221, as well as with additional motors, e.g. as an all-wheel version, The vehicle 200 according to the third embodiment has at least a first, second and, according to one favorable version, a third operating mode, as well as advantageously a pack mode analogous to the vehicle 1 of the first embodiment.

In the first adjustable operating mode, the vehicle 200 operates in the same way as in the first embodiment, wherein at least on side slopes or inclines, e.g. offset planes respectively during a curve drives, the at least second and/or third vehicle component 208 respectively 209, positioned uphill and/or downhill or up and/or down, respectively on the curve inside and/or the curve outside, is/are moved around the joints 210 respectively 211 at the first vehicle component 202, at least partially vertical by the at least one male/female user or an automatic, whereby also the carving effect is generated. By that, the male/female user can stand on the footboards 216 and 217.

FIG. 22 shows a possible design of the third embodiment 200 on a side slope where the fourth and/or fifth vehicle components 258, 259 were also moved via the joints 260, 261 on the first vehicle component.

The vehicle 200 can also comprise one/several mechanical device(s) and/or one/several drive(s), which allows changing automatically or by remote control from one operating mode to another operating mode, and/or from an operating mode to a pack mode, and/or vice versa, and/or change the seat height, and/or the vehicle height, and/or the vehicle length, and/or the vehicle width. Providing the vehicle with at least one mechanical device and/or at least one drive, supported by an electronic control, as well as additional tilt sensors, also makes possible at least in the first operating mode the automatic tilt adaptation of vehicle components and/or parts/sub-components thereof to the ascent respectively the descent at least during uphill/downhill drives, and/or on side slopes, as well as inclined positions, e.g. at offset planes, and/or the tilt in curves.

Further, the length of the second and third vehicle component 208, 209 is shortened in the second adjustable operating mode. In addition, the steering rod 205 is folded around the joints 210 and 211 at the first vehicle component 202, in the direction of the components 208, 209, so that the at least one male/female user can walk behind or beside the vehicle 200, either to steer the vehicle 200 while the vehicle 200 moves automatically driven, or to push it while it is in neutral gear, e.g. if the driving in the driving along mode is locally not possible and/or not permissible. The vehicle 200 can also be used while in neutral gear.

Here too, according to an advantageous version, a third operating mode can be adjusted in which at least the second and/or third and/or fourth and/or fifth vehicle component 208, 209, 258, 259 are secured in a rigid position at the joints 210, 211, 260, 261 on the first vehicle component 202.

The vehicle 200 in the third embodiment otherwise has analog as described for the first embodiment 1 the same equipment.

FIGS. 23-26 show a vehicle 300 which represents a fourth embodiment of the inventive vehicle.

The vehicle 300 has a first vehicle component 302 with a steering rod 305 that is mounted rotating and/or pivoting and is provided with a handlebar 306.

The vehicle 300 furthermore has a second vehicle component 308 with a lever linkage 312, a wheel 318, as well as a third vehicle component 309 with lever linkage 313 and a wheel 319. In this embodiment, the second and third vehicle component 308, 309 are located on the first vehicle component 302, in driving direction in the rear.

Further, a fourth vehicle component 358 with lever linkage 362, one steerable wheel 303, as well as a fifth vehicle component 359 with lever linkage 363, and an additional steerable wheel 303 are located at the first vehicle component 302. In this embodiment, the fourth and fifth vehicle component 358, 359 are located in driving direction at the front of the first vehicle component 302.

Additionally, a sixth vehicle component 388 is located at the first vehicle component 302, said sixth vehicle component 388 having at least one seating surface 389, optionally at least one backrest 390, optionally at least one footboard 391, as well as optionally one/several holding device(s) for holding at least one transport container (not shown), for example a shopping bag or a walking aid and the like, or also for footboards and/or seating surfaces for additional persons.

However, additional lever linkages can also be used, and the use of several joints and/or additional components are constructive conceivable.

In the process, the steering movement is transmitted from the handlebar 306 via the steering rod 305 to the wheels 303. However, it is also conceivable that the steering is realized electrically. The wheels 303 can additionally be driven electrically via motors 320, 321 by means of accumulators (not shown). It is also possible to provide, instead or in addition, the wheels of the second and third vehicle component 308, 309 with motors, and/or to drive the vehicle 300 as an all-wheel version, and/or to be able to steer these wheels. Other types of drives are also possible, such as a combustion engine, or with muscle power via pedals based on the bicycle principle.

The vehicle 300 in the fourth embodiment has at least a first, a second and according to an advantageous version a third operating mode, as well as further advantageously a pack mode, analogous to the first embodiment.

FIG. 23 shows the vehicle 300 in the first and/or third operating mode, where the user is sitting in a lowered seating position. The vehicle 300 is equipped on the first vehicle component with one/several drive(s) as well as sensors (not shown). As a result, in the at least first and/or third operating mode, the seating height can be changed and/or the tilt on side slopes and inclines, e.g. at offset planes, and in curves, as well as the descent during downhill drives and the ascent during uphill drives can be compensated automatically via various joints and/or lever linkages (not shown).

A higher seating position is adjusted by uniformly turning the vehicle components 308, 309 forward and the vehicle components 358, 359 backward, as seen in driving direction, meaning toward each other, at respective joints (not shown) at the first vehicle component 302. The same, but one-sided movement of the second and fourth vehicle component 308, 358 respectively the third and fifth vehicle component 309, 359 can be carried out by the at least one male/female user or an automatic on side slopes as well as in inclined positions, e.g. at offset planes, and in curves. By that also the so-called carving effect is generated.

The tilt compensation of ascent and descent during uphill/downhill drives takes place at the first vehicle component 302 in that the sixth vehicle component 388 with the seat 389, the back rest 390, and the footboard(s) 391 is raised respectively lowered electrically in the respective position in driving direction at the front and/or rear. The vehicle 300 can also be equipped with at least one footboard for at least one second person, which automatically changes its position within the sixth vehicle component, in the manner as previously described.

These functions offer the user a flexible adaptation to the local conditions, with improved riding quality and an increased tilting safety.

For additional safety during uphill drives with a corresponding ascent, the danger of tilting backwards can be reduced further with at least one additional support wheel at the at least second and/or third vehicle component 308, 309.

The comparison in FIG. 24 clearly shows a disadvantageous rigid embodiment of the vehicle 300 in the third operating mode, shown herein, when on a side slope (left image). For this, at least the second and/or third and/or fourth and/or fifth vehicle components 308, 309, 358, 359 arrested in a fixed position at joints (not shown) at the first vehicle component. The tilt, adapted by the male/female user or an automatic in the at least first operating mode (right image), furthermore allows placing at least one seating surface and/or standing surface in an advantageous position.

In FIG. 25, the vehicle 300 is illustrated in the first and/or third operating mode, with a user riding along while seated in a raised seating position. The height adjustment of the seating position can be performed advantageously in many situations. For example, a low seating position is more comfortable for the user at higher speeds while the raised seating position is advantageous at the cash register in the supermarket or in a restaurant.

In FIG. 26, the vehicle 300 is in the pre-selectable second operating mode with a person sitting and a person walking behind who either steers the vehicle 300 while the vehicle 300 is driven, or pushes the vehicle while it is in neutral gear. The vehicle 300 can also be used in neutral gear. Also, at least one footboard can be attached to the vehicle 300. The position of the handlebar 305 was changed to the position intended for pushing in a way that at least two vehicle components and/or parts/sub-components thereof are located in a position, relative to each other, different as compared to the position in the first operating mode.

The vehicle 300 can also comprise one/several mechanical device(s) and/or one/several drive(s) allowing the automatic and/or remote-controlled transition from one operating mode to another operating mode, and/or from an operating mode to the pack mode, and/or vice versa, and/or the change in the seat height, and/or the vehicle height, and/or the vehicle length, and/or the vehicle width, wherein an autonomous control is possible as well.

In the pack mode, the vehicle 300 is folded up, thus creating a compact shape which allows parking the vehicle in a stairwell or the hallway of an apartment or to stow it in the trunk of an automobile. Also in the fourth embodiment, the option can be provided to remove individual components for transport. In this case at least one additional stand can support a stable standing position.

For transport, the vehicle 300 can also be provided with at least one option for attaching it at a trailer hitch of an automobile.

The embodiments shown in FIGS. 1-13, FIGS. 14-19, 20, 21-22 and FIGS. 23-26 and previously described only represent four of the many possible embodiments of the vehicle according to the invention. The options for configuration are so numerous that they cannot all be shown herein.

As a part of possible further configurations, various suspensions of vehicle components and vehicle parts are described in the following, with which the inventive vehicle can also be configured respectively equipped.

In addition, special designs and abstract constructions in the embodiments and pivot point bearings of the vehicle components and/or the respective parts/sub-components thereof are also possible as a vehicle.

All the embodiments according to the invention are based on the relevant basic features of at least two pre-selectable operating modes, namely for riding along and pushing, wherein at least in the first operating mode at least one male/female user or an automatic can move at least the second and/or third vehicle component and/or parts/sub-components thereof directly or indirectly, at least partially vertically, around at least one rotational axis at the first vehicle component, by that at least the vehicle position, or the vehicle length, or the vehicle width, or the vehicle height, or the seat height is changed, and at least in the second operating mode for pushing, at least two vehicle components and/or parts/sub-components thereof are located in a preset position relative to each other different as compared to the position in the first operating mode, as defined in claim 1.

The patent protection relates to all possible design embodiments of a vehicle having the features as disclosed in claim 1.

Suspensions of the Vehicle Components and Vehicle Parts for the Vehicle According to the Invention Suspension of the vehicle components in such a way, that at least one vehicle component, which is located to the left of the vehicle longitudinal axis, and at least one vehicle component which is located to the right of the vehicle longitudinal axis and/or respective parts/sub-components thereof, are suspended dependent or independent of each other, directly or indirectly movable on at least one rotational axle on the first vehicle component, so that through at least one male/female user or an automatic, the vehicle can be tilted to the side in at least one operating mode, as a result of which at least the vehicle position, or the vehicle length, or the vehicle width, or the vehicle height, or the seat height changes.

Suspension of the vehicle components or wheels in such a way, that at least one wheel or one vehicle component, which is located on the left of the vehicle longitudinal axis, and at least one wheel or one vehicle component which is located on the right of the vehicle longitudinal axis and/or respective parts/sub-components thereof, are suspended rotating and/or pivoting while connected to each other on at least one common rotational axle on at least the first vehicle component or the steering column, thus allowing the vehicle to be steered.

Suspension of the vehicle components in such a way, that at least one vehicle component, which is located on the left of the vehicle longitudinal axis, and at least one vehicle component which is located on the right of the vehicle longitudinal axis and/or respective parts/sub-components thereof, are suspended while connected to each other by means of one or several pivot(s), and/or joint(s), and/or link rod(s), and/or transmissions at at least one rotational axis on at least the first vehicle component, so that the at least two vehicle components and/or respective parts/sub-components thereof can be moved by at least one male/female user or an automatic in at least one operating mode, at least in positions along curves and side slopes as well as in inclined positions, e.g. at offset planes, either individually or through lifting one sided or both sided, evenly or unevenly, at least partially vertical, directly or indirectly in the same direction or in different directions, whereby at least the vehicle position, or vehicle length, or vehicle width, or vehicle height, or seat height changes.

Suspension of steerable wheels in such a way, that at least one vehicle component has at least one steerable wheel which is positioned in at least one axle mount, such that it can rotate and/or pivot.

Suspension of the vehicle components in such a way, that at least the second and/or third vehicle component and/or respective parts/sub-components thereof is (are) supported on at least one rotational axle on at least the first vehicle component and/or that at least in the second operating mode, at least two vehicle components and/or respective parts/sub-components thereof are moved via additional bearing points to a position, relative to each other, different as compared to the position in the first operating mode.

Suspension of standing surfaces in such a way, that at least one standing surface is attached movable on at least one vehicle component by suspending the standing surface(s) at additional joints, as a result of which in at least one operating mode the at least one male/female user or an automatic can tilt the standing surface(s) sideways at least on side slopes as well as in inclined positions, e.g. at offset planes and curves, to compensate for a tilt of the slanted position, independent of a movement of the corresponding vehicle component.

Suspension of vehicle parts in such a way, that the second and the third vehicle component and/or also additional vehicle components are composed of respectively at least two parts, connected by at least one joint, wherein in an additional pack mode the respectively at least two parts can each be rotated and/or pivoted around the corresponding joint(s).

Suspension of vehicle parts in such a way, that at least one support wheel and/or at least one stand is (are) positioned via at least one bearing point so as to rotate and/or pivot on at least one vehicle component.

Suspension of vehicle parts in such a way, that the first vehicle component is provided with a height-adjustable mounting for at least the second and third vehicle component, and/or that the at least second and third vehicle component, via joints and/or provided with at least one mechanical device and/or drive, can compensate the ascending slope as well as the descending slope during uphill drives and downhill drives by adjusting the standing and/or sitting surface by a male/female user or an automatic.

Suspension of vehicle parts in such a way, that at least one vehicle seat is supported via one/several joint(s) on at least the first vehicle component, and/or that one/several vehicle component(s) is (are) supported rotating and/or pivoting on at least the first vehicle component, and/or that the vehicle is provided with at least one mechanical device and/or drive, whereby at least one male/female user or an automatic can change the seat height and/or the vehicle height in at least one operating mode.

Suspension of vehicle parts in such a way, that at least one steering rod is supported rotating and/or pivoting via at least one joint on at least the first vehicle component, thus allowing a change in the steering rod position, dependent and independent of a movement of the first vehicle component.

Suspension of vehicle parts in such a way, that the front axle and/or the steering rod are rigidly suspended/fastened on at least the first vehicle component and the steering movement occurs via at least one mechanical device and/or drive electrically controlled.

The invention claimed is:

1. A vehicle, comprising:
a first vehicle component having a steering rod mounted both rotatably and pivotably via at least one joint, whereby
   a position of the steering rod is changeable independently of a movement of the first vehicle component, and
   steering is carried out directly or indirectly by turning the steering rod;
a first wheel, a second wheel and a third wheel; and
a second vehicle component and a third vehicle component, which are positioned on left and right sides of a longitudinal axis of the vehicle, respectively,
   the second vehicle component comprising a part to which the second wheel is attached, and the third vehicle component comprising a part to which the third wheel is attached, and
   the second vehicle component and the third vehicle component being connected separately to the first vehicle component, wherein
the vehicle extends in a longitudinal direction from a rear end to a front end thereof;
the first wheel forms a front wheel of the vehicle and the second and third wheels form rear wheels of the vehicle, or the first wheel forms a rear wheel of the vehicle and the second and third wheels form front wheels of the vehicle;
at least one of the first wheel, the second wheel and the third wheel is steerable; and
the vehicle is configured to operate in two operating modes that are:
   a first operating mode for a user to ride along the vehicle in a forward driving direction while the vehicle is in contact with the ground via the first wheel, the second wheel and the third wheel riding along, in which
      at least one of the first wheel, the second wheel and the third wheel is driven at least for a period of time, and
      at least one of the part of the second vehicle component to which the second wheel is attached and the part of the third vehicle component to which the third wheel is attached is movable, at least in part vertically, around a rotational axis relative to the first vehicle component, such that the vehicle is tiltable sideways, to thereby allow a straight-line drive is laterally on a slope in an inclined position, and
   a second operating mode for the user to steer the vehicle by means of the steering rod while walking and while the vehicle is in contact with the ground via the first wheel, the second wheel and the third wheel, in which
      the steering rod is more inclined towards the rear end of the vehicle than in the first operating mode, and is inclined opposite to the forward driving direction, and
      the distance from an axis of the first wheel to axes of the second and third wheels in the longitudinal direction of the vehicle is less than that in the first operating mode.

2. The vehicle according to claim 1, wherein
in the first operating mode, movement of the part of the second vehicle component to which the second wheel is attached and the part of the third vehicle component to which the third wheel is attached takes place individually or in the form of a lifting movement one-sided or both-sided evenly or unevenly in one direction or in different directions.

3. The vehicle according to claim 1, wherein
suspension of the second and third vehicle components takes place at an rotational axis of the first vehicle component.

4. The vehicle according to claim 1, wherein
the vehicle is configured to further operate in a third operating mode in which the user is on the vehicle, wherein
   at least one of the first wheel, the second wheel and the third wheel is driven at least at times, and the second and the third vehicle components are locked such that the second wheel and the third wheel cannot change their positions relative to the first vehicle component.

5. The vehicle according to claim 1, wherein
the first wheel is steerable and is arranged in the first vehicle component, on a mounting which is mounted rotating or pivoting in an axle receptacle.

6. The vehicle according to claim 1, further comprising:
a motor, configured to steer the vehicle, and
an control electronic, configured to electrically control the motor.

7. The vehicle according to claim 1, wherein
in the first operating mode, a tilt compensation of inclination in a position of a standing surface is carried out independently of a movement of the second or third vehicle component.

8. The vehicle according to claim 1, wherein
each of the second and third vehicle components comprises two parts which are connected by a joint, wherein one of the two parts of the second vehicle component is the part to which the second wheel is attached and one of the two parts of the third vehicle component is the part to which the third wheel is attached,
in an additional pack mode, the at least two parts of one vehicle component are respectively pivoted or rotated around the joint connecting the two parts.

9. The vehicle of claim 8, wherein at least one of the first wheel, the second wheel and the third wheel is removable in the pack mode for transportation.

10. The vehicle according to claim 1, further comprising at least one holding fixture or holding option that work with a recording or a recording option for attaching an object in the vehicle.

11. The vehicle according to claim 1, wherein
the vehicle is provided with pedals to enable a bicycle-like drive.

12. The vehicle according to claim 1, wherein
the vehicle is configured to be controllable remotely or autonomously.

13. The vehicle according to claim 1, wherein
the vehicle further includes a mechanical device or drive for driving components thereof.

14. The vehicle according to claim 1, wherein the vehicle further includes a towing device for attaching a trailer during towing.

15. The vehicle according to claim 1, wherein
the vehicle is provided with at least one holder or holding option to be attached to a trailer hitch of an automobile for transport.

16. The vehicle of claim 1 further comprising a seat attached to the first vehicle component at least in the first operating mode.

17. The vehicle of claim 1, wherein the first wheel is connected to the first vehicle component by means of a fourth vehicle component that is pivotably attached to the first vehicle component, wherein a position of the fourth vehicle component relative to the first vehicle component is in the second operating mode different from that in the first operating mode.

18. The vehicle of claim 1, wherein
the second vehicle component comprises the part to which the second wheel is attached and a part which is attached to the first vehicle component, the two parts of the second vehicle component being connect by a joint; and the third vehicle component comprises the part to which the third wheel is attached and a part which is attached to the first vehicle component, the two parts of the third vehicle component being connect by a joint.

19. The vehicle of claim 1, wherein a fourth wheel is provided on a same end in the longitudinal direction of the vehicle as the first wheel.

20. The vehicle of claim 1, further comprising a motor for driving at least one of the first, second and third wheels.

21. The vehicle of claim 20, wherein the motor is adapted for being used for recuperation.

22. The vehicle of claim 1, wherein as the longitudinal distance between the first wheel and the second and third wheels changes from the first operation mode to the second operation mode, an overall length of the vehicle decreases.

23. The vehicle of claim 22, wherein as the vehicle changes from the first operating mode to the second operating mode, at least one of a vehicle width and a vehicle height changes.

24. The vehicle of claim 1, further comprising a handlebar attached to the steering rod, the position of said handle bar being adapted so that
in the first operating mode, said handle bar is grabbed by hands of the user riding along with the vehicle, and
in the second operating mode, said handle bar is grabbed by at least one of the hands of the user walking behind or next to the vehicle.

25. The vehicle of claim 1, wherein the vehicle is further configured to operate in a neutral gear such that in the second operating mode, the user pushes the vehicle via the steering rod and steers the vehicle via the steering rod when the vehicle is in the neutral gear.

26. A vehicle, comprising:
a first vehicle component having a steering rod mounted both rotatably and pivotably via at least one joint, whereby
a position of the steering rod is changeable independently of a movement of the first vehicle component, and
steering is carried out directly or indirectly by turning the steering rod;
a steerable wheel; and
a second vehicle component and a third vehicle component, which
are respectively provided with left and right wheels,
are connected separately to the first vehicle component, and
are positioned on left and right sides of a longitudinal axis of the vehicle, respectively, wherein
the vehicle is configured to operate in two operating modes that are:
a first operating mode for a user to ride along the vehicle, in which
at least one of the steerable wheel and the left and right wheels is driven at least for a period of time, and
at least one of the second vehicle component or the third vehicle component is movable, at least in part vertically, around a rotational axis at the first vehicle component, such that the vehicle is tiltable sideways, to thereby allow a straight-line drive laterally on a slope in an inclined position, and
a second operating mode for the user to push the vehicle, in which
the steering rod is inclined a direction different from a direction of the steering rod in the first operating mode, at least two of the first to third vehicle components are each located in a preset position, relative to each other, the positions being different from those in the first operating mode, and at least one of a length, a width, or a height of the vehicle is changed to a preset value and is different from that in the first operating mode.

27. Vehicle with:

a first vehicle component on which at least one steering rod which is mounted rotatably and pivotably via at least one joint, whereby the position of the at least one steering rod can be changed independently of a movement of the first vehicle component and the steering is carried out directly or indirectly by turning the steering rod;

at least one steerable wheel;

at least a second and a third vehicle component, wherein at least the second and the third vehicle component, which are respectively provided with at least one wheel, are positioned on the left and right side of the vehicle longitudinal axis;

at least two operating modes in which the vehicle can be moved respectively on the at least three wheels wherein at least one person and material or one person or material can be transported in each of the two operating modes and a golf bag or a golf bag as well as auxiliary equipment or machines can be used which can also remain on the vehicle during a change of the operating mode, namely a first pre-selectable operating mode for riding along, in which at least one user can stand or sit or stand and sit on at least one surface and steers the vehicle via the steering rod, wherein at least one of the wheels on the vehicle is driven at least some of the time, and in which at least one user or an automatic device can move at least the second or third or second and third vehicle component and parts, sub-components thereof or parts, sub-components thereof, directly or indirectly, at least in part vertically, around at least one rotational axis at the first vehicle component thereby the vehicle tilts sideways and at least the vehicle position changes, meanwhile a straight-line drive is possible at least lateral on a slope as well as in inclined positions, and at offset planes as well as a second pre-selectable operating mode for pushing, in which the steering rod assumes a position different from its position in the first pre-selectable operating mode, namely an inclined position in a direction opposite to the direction of driving in the first operating mode, at least two vehicle components and parts, sub-components thereof or parts, sub-components thereof are located in a preset position, relative to each other, different as compared to the position in at least the first operating mode, as well as the vehicle length or vehicle width or vehicle height, or even several of the aforementioned vehicle dimensions, presently change compared to the first operating mode for driving along and, in which the at least one user walks behind or beside the vehicle and either steers it by means of the steering rod while it moves automatically driven, or pushes it by means of the steering rod while it is in neutral gear.

* * * * *